(12) United States Patent
Tanaka et al.

(10) Patent No.: US 6,514,143 B1
(45) Date of Patent: Feb. 4, 2003

(54) PROGRAM EXECUTING SYSTEM, RELAY DEVICE, MANUAL CONTROLLER, RECORDING MEDIUM, PROGRAM, AND PROGRAM EXECUTING APPARATUS

(75) Inventors: Makoto Tanaka, Tokyo (JP); Toru Akazawa, Tokyo (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/656,463

(22) Filed: Sep. 6, 2000

(30) Foreign Application Priority Data

Sep. 10, 1999 (JP) .............................. 11-256745
Jul. 28, 2000 (JP) ...................... 2000-229240

(51) Int. Cl.[7] .............................................. A63F 13/02
(52) U.S. Cl. .............................. 463/37; 463/38; 463/39
(58) Field of Search .............................. 463/36, 37, 38, 463/39, 40, 45, 47; 345/156–158, 161, 169; 273/148 R, 148 B

(56) References Cited

U.S. PATENT DOCUMENTS

| | | | | |
|---|---|---|---|---|
| 4,151,407 A | * | 4/1979 | McBride et al. ............ 250/199 |
| 4,531,740 A | * | 7/1985 | Green et al. ............ 273/148 B |
| 4,924,216 A | * | 5/1990 | Leung ........................ 340/709 |
| 5,098,110 A | * | 3/1992 | Yang ........................... 273/438 |
| 5,414,761 A | * | 5/1995 | Darbee ...................... 379/102 |
| 5,451,053 A | * | 9/1995 | Garrido ..................... 273/148 |
| 5,759,100 A | * | 6/1998 | Nakanishi ..................... 463/37 |
| 5,796,387 A | * | 8/1998 | Curran et al. .............. 345/158 |
| 5,806,849 A | | 9/1998 | Rutkowski .................. 273/438 |
| 5,838,307 A | * | 11/1998 | Bouton ....................... 345/168 |
| 5,881,366 A | * | 3/1999 | Bodenmann et al. ......... 455/66 |
| 5,896,125 A | * | 4/1999 | Niedwiecki ................. 345/168 |
| 5,984,785 A | * | 11/1999 | Takeda et al. ................ 463/38 |
| 6,071,194 A | * | 6/2000 | Sanderson et al. ............ 463/37 |
| 6,078,789 A | * | 6/2000 | Bodenmann et al. ......... 455/66 |
| 6,213,880 B1 | * | 4/2001 | Sim ............................. 463/36 |
| 6,229,526 B1 | * | 5/2001 | Berstis ....................... 345/157 |
| 6,280,327 B1 | * | 8/2001 | Leifer et al. ................ 345/156 |

FOREIGN PATENT DOCUMENTS

| | | |
|---|---|---|
| JP | 05-019931 | 1/1993 |
| JP | 08-110827 | 4/1996 |
| JP | 08-272508 | 10/1996 |
| JP | 10-133799 | 5/1998 |
| JP | 10-171573 | 6/1998 |
| TW | 275950 | 5/1996 |
| TW | 307844 | 6/1997 |
| WO | 0 933 724 A1 | 8/1999 |

OTHER PUBLICATIONS

3DO REAL (Operating Instructions), Panasonic, copy right Matsushita Electric Industrial Co., Ltd. 1994, pp. 7–20.*
3DO* Wireless Controller (Instruction Book), Nakitek, copy right Naki Interactive Technologies, 1994.*

* cited by examiner

*Primary Examiner*—Jessica Harrison
*Assistant Examiner*—Alex F. R. P. Rada, II
(74) *Attorney, Agent, or Firm*—Lerner, David, Littenberg, Krumholz & Mentlik, LLP

(57) ABSTRACT

The time required to perform communications between an entertainment apparatus and a manual controller having complex and sophisticated functions which is connected to the entertainment apparatus is reduced. A type of control data to be outputted from a manual controller when control units including direction keys are operated is defined (limited) according to an application program that is recorded in an optical disk and read by the entertainment apparatus. The manual controller has a setting register for setting such a type of control data. After a type of control data is defined in the setting register of the manual controller from the entertainment apparatus, a CPU of the manual controller transmits only control data of the type set in the setting register for each frame of image. By thus limiting types of control data to be transmitted, the time required to perform communications between the entertainment apparatus and the manual controller is shortened.

19 Claims, 19 Drawing Sheets

PROGRAM EXECUTING SYSTEM, RELAY DEVICE, MANUAL CONTROLLER, RECORDING MEDIUM, PROGRAM, AND PROGRAM EXECUTING APPARATUS

BACKGROUND OF THE INVENTION

1. Field of the Invention

The present invention relates to a program executing system, a relay device, a manual controller, a recording medium, a program, and a program executing apparatus which are preferably applicable to an entertainment system such as a television game system or the like.

2. Description of the Related Art

Manual controllers that have heretofore been used with television game apparatus or the like have a control unit including direction buttons for indicating the directions in which to move a character in its entirety, i.e., four positive and negative directions along X- and Y-axes on the display screen of a television receiver, and control buttons for indicating movements of left and right arms and left and right legs of the character.

A manual controller with such a control unit with a plurality of buttons is connected to a television game apparatus, and sends control data of the control unit, indicative of whether the user has acted on any of the buttons or not, to the television game apparatus.

The television game apparatus has an image generator processor, and is connected to the television receiver that serves as a display monitor. Based on the content of control data sent from the manual controller, the image generator processor calculates and renders an image to be displayed in a next frame on the display screen of the television receiver.

The image calculated and rendered by the image generator processor is stored in a VRAM (video RAM). When a frame switching signal is generated based on a clock signal in the television game apparatus, the image stored in the VRAM is transferred from the television game apparatus as an NTSC television signal or the like and displayed on the display screen of the television receiver.

The television game apparatus performs a succession of processes (1)–(3), given below, in each frame, e.g., in $\frac{1}{60}$ second, as shown by an upper sequence 1 in FIG. 19 of the accompanying drawings, for thereby displaying images based on control actions on the manual controller on the display screen on a real-time basis.

(1) The television game apparatus communicates with the manual controller during a time ta.

(2) The television game apparatus calculates a game image depending on communications with the manual controller during a time tb.

(3) The television game apparatus stores the calculated game image in the VRAM during a time tc.

Recently, with the advent of more sophisticated and complicated games, there have been a demand for more control units on manual controllers and a demand for control units with an ability to produce analog outputs, i.e., multigradation outputs, depending on the pressing force on buttons, rather than an ability to produce simple on/off outputs, e.g., binary outputs.

To meet the above demands, it is necessary to increase the amount of data, e.g., the number of bytes of data, transmitted from the manual controller to the television game apparatus.

However, if the amount of data transmitted from the manual controller to the television game apparatus is increased, then the times required to perform the above processes (1) and (2) are increased, resulting in a delay in the process (3).

When the process (3) is delayed, the image may be displayed too late for the new frame subsequent to the given period, i.e., $\frac{1}{60}$ second as shown by a lower sequence 2 in FIG. 19, with the result that the displayed image on the television receiver tends to be disturbed or slowed down like a slow-motion image.

If the rate of communications between the television game apparatus and the manual controller is to be increased, then the manual controller needs to have a higher-speed microcomputer and a higher-speed clock generator, and hence becomes more expensive to manufacture.

Increasing the rate of communications between the television game apparatus and the manual controller poses other problems in that since noise and unwanted radiation rise, some measures are necessary to reduce such noise and unwanted radiation, requiring an additional cost to manufacture the manual controller and the television game apparatus.

SUMMARY OF THE INVENTION

It is therefore an object of the present invention to provide a program executing system, a relay device, a manual controller, a recording medium, a program, and a program executing apparatus which do not increase the time required to perform communications between a manual controller and an apparatus to which the manual controller is connected, which meet a demand for more control units and a demand for control units with an ability to produce analog outputs depending on the pressing force on buttons, rather than an ability to produce simple on/off outputs, and which makes it possible to perform wireless communications between the manual controller and the apparatus to which the manual controller is connected.

According to an aspect of the present invention, a program executing system comprises a program executing apparatus for reading and executing a program stored in a recording medium, and a manual controller connected to the program executing apparatus and having a plurality of control units, for sending a control request from the user as control data to the program executing apparatus in response to operation by the user of at least one of the control units, the program executing apparatus having means for sending transmission definition indication data defining a type of control data to be sent from the manual controller, to the manual controller when the program executing apparatus starts executing and/or is executing the program.

With the above arrangement, when the program executing apparatus starts executing and/or is executing the program, the program executing apparatus sends transmission definition indication data defining a type of control data to be sent from the manual controller, to the manual controller. Therefore, the amount of control data sent from the manual controller to the program executing apparatus can possibly be reduced when the program executing apparatus starts executing and/or is executing the program.

A relay device connected to the program executing apparatus for performing wireless communications between the program executing apparatus and the manual controller may be disposed between the program executing apparatus and the manual controller.

If the manual controller has a storage unit for storing the transmission definition indication data, then it is not necessary to send the transmission definition indication data from the program executing apparatus to the manual controller while the program is being executed unless the transmission definition indication data is changed.

If the program executing apparatus is to update or change the content of the transmission definition indication data defining a type of control data to be sent from the manual controller, then updating transmission definition indication data may be sent to the manual controller to update the content of the transmission definition indication data when the program executing apparatus is executing the program.

According to another aspect of the present invention, a program executing system comprises a program executing apparatus for reading and executing a program stored in a recording medium, a relay device connected to the program executing apparatus and having a first wireless communication unit, and a manual controller having a plurality of control units and a second wireless communication unit for communicating with the first wireless communication unit, for sending a control request from the user as control data to the relay device in response to operation by the user of at least one of the control units, the program executing apparatus having means for sending transmission definition indication data defining a type of control data to be sent from the manual controller via the relay device, to the relay device when the program executing apparatus starts executing and/or is executing the program.

With the above arrangement, when the program executing apparatus starts executing and/or is executing the program, the program executing apparatus sends transmission definition indication data defining a type of control data to be sent from the manual controller via the relay device to the program executing apparatus, to the relay device. Therefore, the amount of control data sent from the manual controller via the relay device to the program executing apparatus can possibly be reduced when the program executing apparatus starts executing and/or is executing the program.

If the relay device has a storage unit for storing the transmission definition indication data, then it is not necessary to send the transmission definition indication data from the program executing apparatus to the relay device while the program is being executed unless the transmission definition indication data is changed.

If the program executing apparatus is to update or change the content of the transmission definition indication data defining a type of control data to be sent from the manual controller, then updating transmission definition indication data may be sent to the relay device to update or change the content of the transmission definition indication data when the program executing apparatus is executing the program.

The program executing apparatus may comprise an entertainment apparatus for reading and executing a program stored in a recording medium detachably loaded in the entertainment apparatus.

According to still another aspect of the present invention, a relay device is capable of performing wireless communications between a program executing apparatus and a manual controller, or is capable of performing wireless communications between a program executing apparatus and a manual controller, and processes wireless control data sent from the manual controller and sends the processed wireless control data to the program executing apparatus.

According to yet another aspect of the present invention, a manual controller having a plurality of control units, for sending control data in response to operation by the user of at least one of the control units, comprises control data transmission defining means for defining a type of the control data to be sent in response to an externally inputted instruction.

Since the manual controller has the control data transmission defining means for defining a type of the control data to be sent in response to an externally inputted instruction, the time during which the control data is outputted can possibly be reduced even if there are many types of control data.

If the manual controller has a storage unit for storing the type of the control data to be sent in response to the externally inputted instruction, then the control data transmission defining means may output control data based on the type of the control data stored in the storage unit.

If the manual controller is used in combination with a pin-compatible slave manual controller, then the storage unit may have means for storing a type of control data to be outputted from the slave manual controller when the manual controller is turned on. Consequently, the manual controller may be used instead of the slave manual controller.

According to yet still another aspect of the present invention, a recording medium stores a program comprising the steps of confirming an electric connection with a manual controller having a plurality of control units, for sending control data in response to operation by the user of at least one of the control units, and transmitting transmission definition indication data defining a type of the control data to be sent from the manual controller, to the manual controller.

When the program stored in the recording medium is executed by a program executing apparatus connected to the manual controller, it is possible for the program executing apparatus to define a type of control data to be sent from the manual controller.

According to a further aspect of the present invention, a recording medium stores a program comprising the steps of confirming an electric connection with a manual controller having a plurality of control units, for sending control data in response to operation by the user of at least one of the control units, causing the manual controller to enter from a normal mode into a transmission definition indication mode for defining a type of the control data to be sent, transmitting transmission definition indication data defining a type of the control data to be sent to the manual controller, and causing the manual controller to enter the transmission definition indication mode into the normal mode.

With the above arrangement, when the above steps are carried out while the program is being executed, the definition of a type of the control data to be sent from the manual controller can be updated or changed while the program is being executed.

According to a still further aspect of the present invention, a program comprises the steps of confirming an electric connection with a manual controller having a plurality rality of control units, for sending control data in response to operation by the user of at least one of the control units, and transmitting transmission definition indication data defining a type of the control data to be sent from the manual controller, to the manual controller.

When the above program is executed by a program executing apparatus connected to the manual controller, it is possible for the program executing apparatus to define a type of control data to be sent from the manual controller.

According to a yet still further aspect of the present invention, a program executing apparatus for being connected to a manual controller having a plurality of control units, for sending control data in response to operation by the user of at least one of the control units, and reading and executing a program stored in a recording medium, comprises transmission definition indication data sending means for sending transmission definition indication data defining a type of the control data to be sent from the manual controller to the program executing apparatus, to the manual controller, according to a content of the read program.

With the above arrangement, the transmission definition indication data sending means sends transmission definition indication data defining a type of the control data to be sent from the manual controller to the program executing apparatus, to the manual controller. As a result, it is possible for the program executing apparatus to define a type of control data to be sent from the manual controller.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
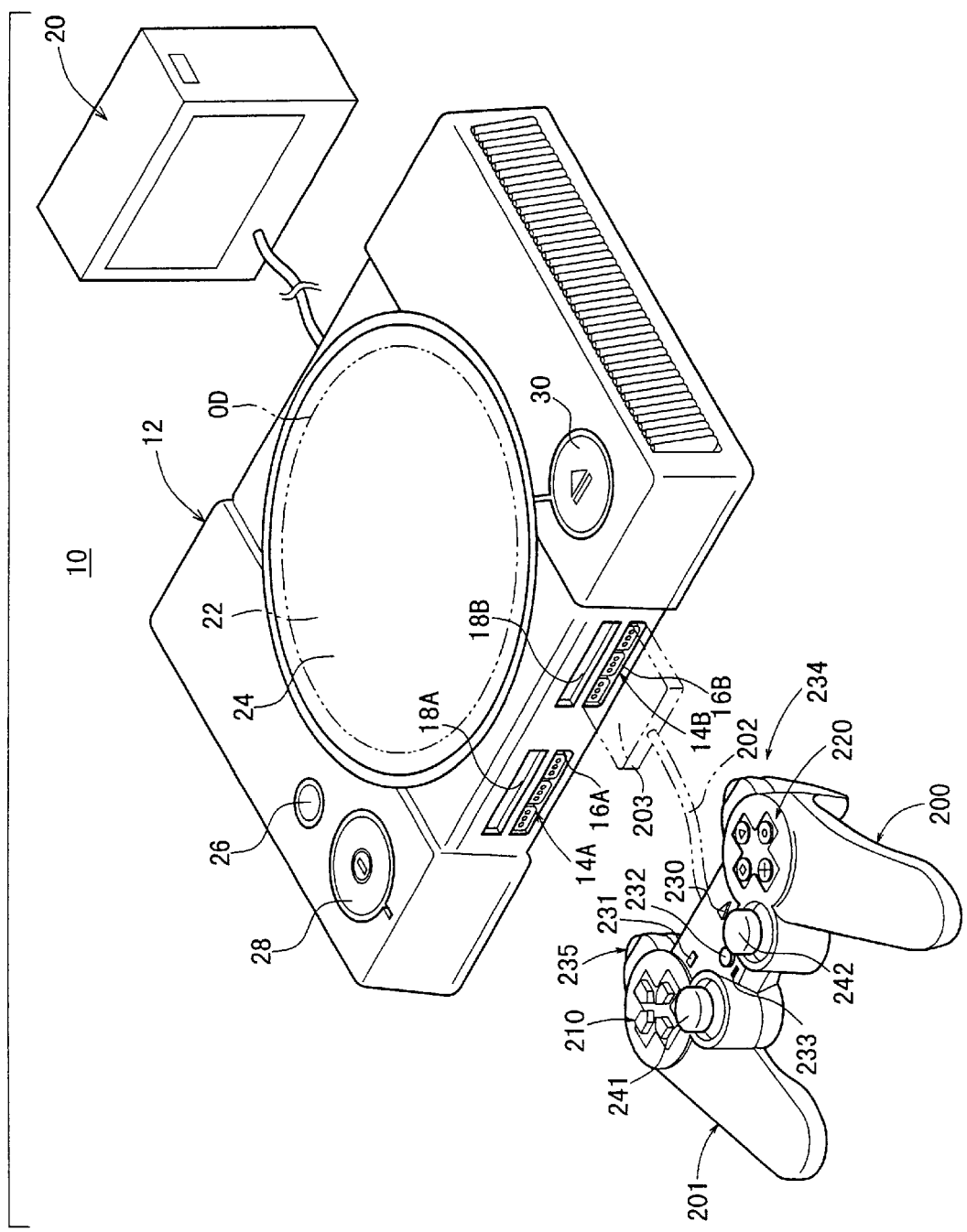
FIG. 1 is a perspective view of an entertainment system according to an embodiment of the present invention.

FIG. 1 shows in perspective an entertainment system 10 according to an embodiment of the present invention.

As shown in FIG. 1, the entertainment system 10 basically comprises an entertainment apparatus 12 as a program executing apparatus for reading and executing various programs stored in a recording medium such as an optical disk which may be a CD-ROM (Compact Disk Read-Only Memory), a DVD (Digital Video Disk), or the like, a manual controller 200 detachably connected to one of lower jacks 16A, 16B of respective two slots 14A, 14B of the entertainment apparatus 12, and a display monitor 20 such as a television receiver which is supplied with video and audio output signals from the entertainment apparatus 12.

The slots 14A, 14B also have upper jacks 18A, 18B, respectively, to which there can be connected a memory card having a flash memory for storing interim game data or a portable information terminal which can be disconnected for playing a game independently.

The entertainment apparatus 12 has an optical disk drive 22 functioning as a reading and reproducing device for playing back an optical disk OD in which various programs (application programs, device drivers, etc.) and data are recorded, and a graphic system functioning as an image processing means for displaying background images and characters on the display screen of the display monitor 20 according to a program recorded in the optical disk OD.

The entertainment apparatus 12 also has a disk loading unit 24 for loading the optical disk OD, a reset switch 26 for resetting a computer (CPU) in the entertainment apparatus 12, a power supply switch 28, and a lid opening button 30 for opening a lid of the disk loading unit 24 to allow the optical disk OD to be placed into or removed from the disk loading unit 24.

Figure 2:
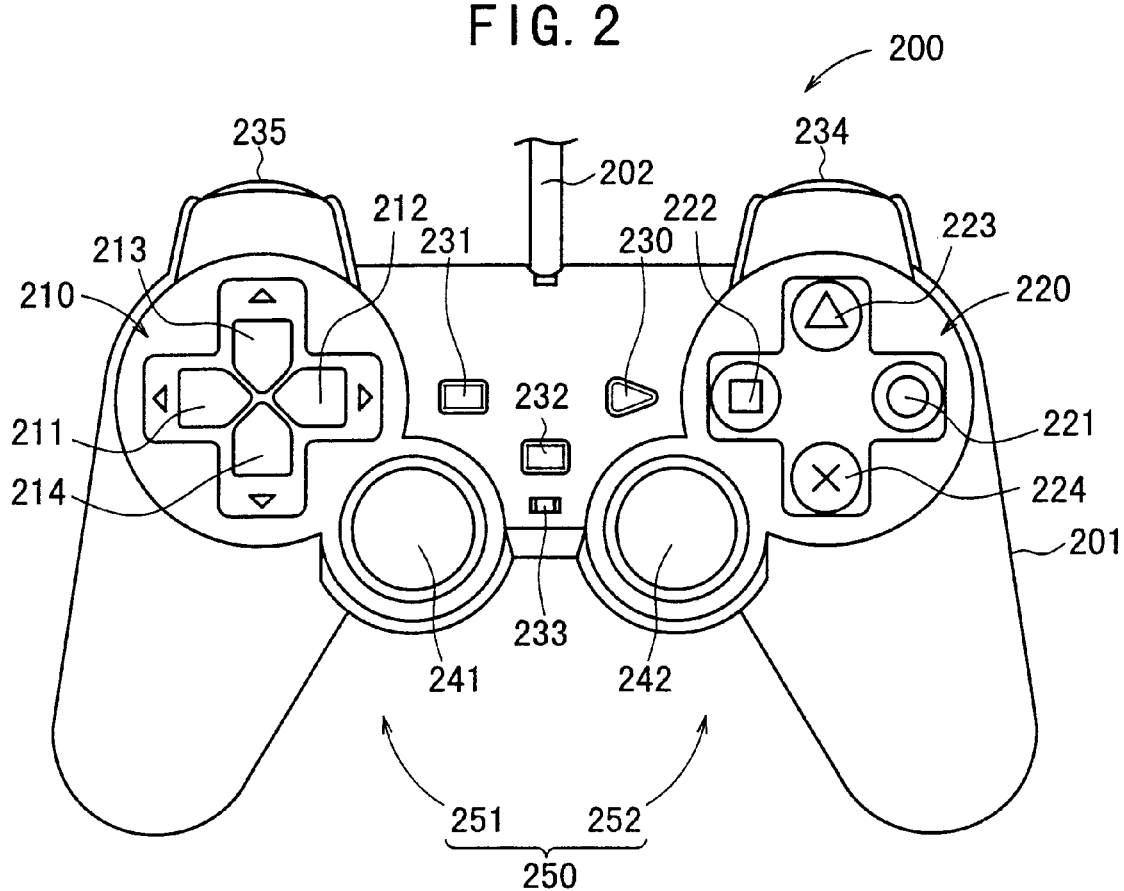
FIG. 2 is a plan view of a manual controller of the entertainment system shown in FIG. 1.

FIG. 2 shows in plan the manual controller 200 of the entertainment system 10 illustrated in FIG. 1.

As shown in FIGS. 1 and 2, the manual controller 200 and the entertainment apparatus 12 are connected to each other by a connecting cord 202 as a multicore cable extending from a casing 201 of the manual controller 200. A plug 203 as a connector is attached to the distal end of the connecting cord 202. When the plug 203 is inserted into the jack 16A or 16B of the entertainment apparatus 12, the manual controller 200 is electrically and mechanically connected to the entertainment apparatus 12.

The casing 201 of the manual controller 200 supports thereon a first control unit 210 and a second control unit 220 on its upper surface.

The first control unit 210 has its function determined by an application program recorded in the optical disk OD. Normally, the first control unit 210 serves as a control unit for moving a character displayed on the display screen of the display monitor 20. The first control unit 210 has first through fourth control buttons 211, 212, 213, 214, serving as control switches, that the user or game player can press to move a displayed character upwardly, downwardly, leftwardly, and rightwardly on the display screen of the display monitor 20.

For example, the first control button 211 is allocated a function to move the character to the left, the second control button 212 a function to move the character to the right, the third control button 213 a function to move character upwardly, and the fourth control button 214 a function to move the character downwardly.

The second control unit 220 also has fifth through eighth control buttons 221, 222, 223, 224 serving as control switches. The second control unit 220 has its function determined by an application program recorded in the optical disk OD. Normally, the second control unit 220 serves as a control unit for changing the states of the displayed character. For example, the fifth control button 221 (marked with "○"), is allocated a function to move the left arm of the displayed character, the sixth control button 222 (marked with "□") a function to move the right arm of the displayed character, the seventh control button 223 (marked with "Δ") a function to move the left leg of the displayed character, and the eighth control button 224 (marked with "x") a function to move the right leg of the displayed character.

The casing 201 also supports thereon joystick control units 241, 242 that can be swiveled to enter analog inputs.

The casing 201 further supports thereon a start switch 230 for instructing the entertainment apparatus 12 to start a game, a selection switch 231 for selecting a level of difficulty of the game, a mode selection switch 232 for selecting a control mode about whether the joystick control units 241, 242 can be used or not, and an indicator 233 comprising a light-emitting element for indicating a selected control mode.

The casing 201 has on its back an R button 234 comprising two R1, R2 buttons 234a, 234b and an L button 235 comprising two L1, L2 buttons 235a, 235b, each button serving as a control unit whose function is set by an application program.

The above various control units are also collectively referred to as control units 250.

The entertainment system 10 thus constructed operates as follows: The optical disk drive 22 reads a program recorded in the optical disk OD, and the user or game player operates various buttons and switches of the first and second control units 210, 220 and other control units on the manual controller 200. Control requests based on the control actions by the user are transmitted as control data from the control units 250 to the entertainment apparatus 12. In response to those control requests, the entertainment apparatus 12 calculates a desired image, displays the image on the display screen of the display monitor 20, and/or generates an audio output, thereby executing a game according to the program read from the optical disk OD. The execution of the game mainly represents controlling the progress of the game and the display of images and the generation of sounds.

The control units 250 of the manual controller 200 includes 12 control units 251 for producing 4-bit multigradation outputs, i.e., the first control unit 210 having the first through fourth control buttons 211, 212, 213, 214, the second control unit 220 having the fifth through eighth control buttons 221, 222, 223, 224, the R buttons 234, and the L buttons 235. Each of these control units 251 comprises a pressure-sensitive element whose resistance varies depending on the strain thereof (also referred to as "pressure-sensitive resistor").

The manual controller 200 has A/D converters which convert a change in the resistance of the pressure-sensitive elements from an analog signal into a digital signal which represents a 4-bit (18-gradation) output as a multigradation output. Alternatively, the manual controller 200 has either comparator connected to output terminals of the pressure-sensitive elements for producing a 1-bit output (binary output), i.e., an output of "1" or "0", indicative of whether the corresponding button is pressed or not, or A/D converters for converting a change in the resistance of the pressure-sensitive elements from an analog signal into a digital signal, and producing a 1-bit output (binary output), i.e., an output of "1" or "0", indicative of whether the corresponding button is pressed or not based on the LSB (Least Significant Bit) of the digital signal.

The control units 250 also include 3 binary-output control units 252 including the start switch 230, the selection switch 231, and the mode selection switch 232. Each of these switches comprises an on-off switch.

The control units 250 further include the two joystick control units 241, 242 each of which is connected to two rheostats. Each of the rheostats produces an output voltage which is converted from an analog signal into a digital signal representing an 8-bit multigradation output.

Figure 3:
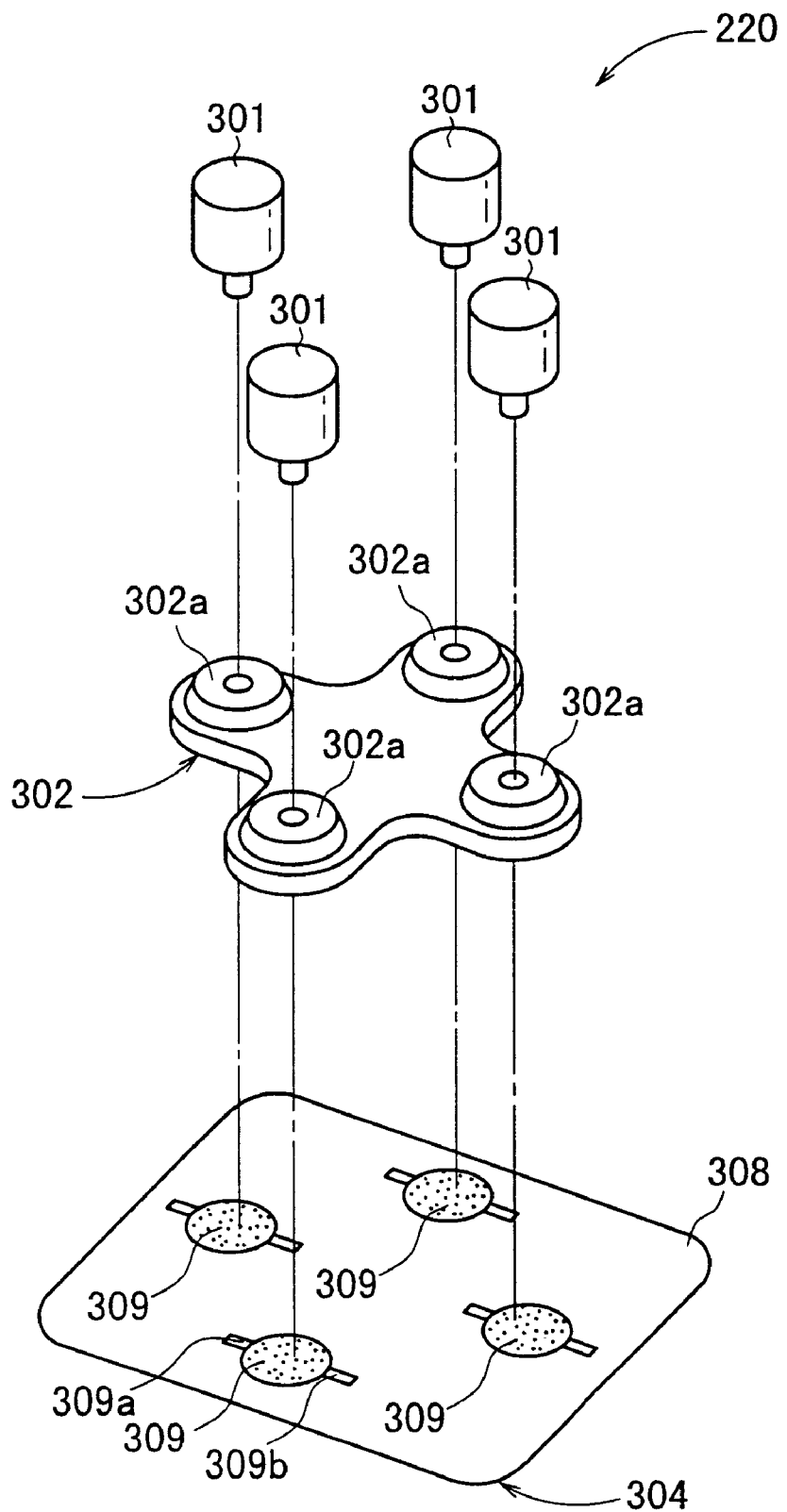
FIG. 3 is an exploded perspective, partly omitted from illustration, of a control unit capable of producing multigradation outputs.
Figure 4:
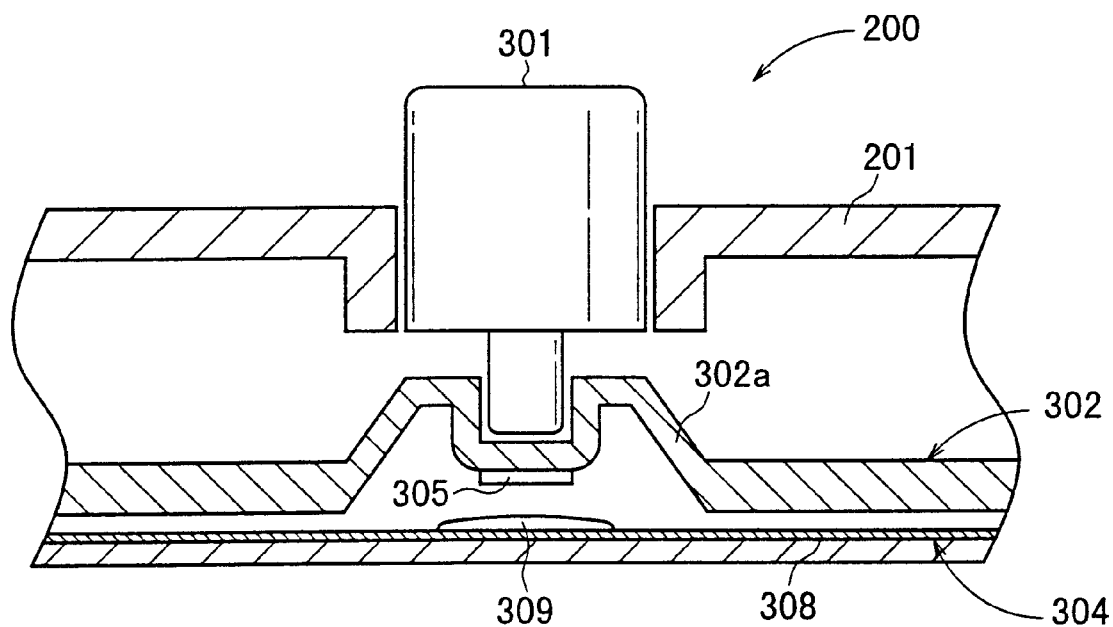
FIG. 4 is an enlarged fragmentary cross-sectional view of the control unit capable of producing multigradation outputs.

FIG. 3 shows in exploded perspective the second control unit 220, for example, as one of the 12 control units 251 each capable of producing a multigradation output or a binary output as control information. FIG. 4 shows the second control unit 220 in fragmentary cross section at an enlarge scale.

As shown in FIG. 3. the second control unit 220 comprises four control buttons 301 corresponding respectively to the control buttons 221, 222, 223, 224, a resilient member 302, and a pressure-sensitive resistor assembly 304.

As shown in FIG. 4, each of the control buttons 301 has a head exposed and projecting upwardly from an upper surface of the casing 201 and mounted axially movably in the casing 201.

The resilient member 302 has four upwardly projecting resilient pads 302a made of insulating rubber or the like and having respective upper walls supporting the respective lower ends of the control buttons 301. When each of the control buttons 301 is pressed by the user, a slanted surface of the corresponding resilient pad 302a flexes and moves downwardly in unison with the control button 301. When the control button 301 is released of the manual push, the slanted surface of the resilient pad 302a springs back, pushing the control button 301 upwardly. Therefore, the resilient member 302 serves as an urging means for automatically restoring the pressed control button 301 to its original position.

As shown in FIG. 4, an insulating movable contact 305 is attached to an inner surface of the upper wall of the resilient pad 302a. The movable contact 305 is movable downwardly when the resilient pad 302a flexes downwardly in response to a depression of the control button 301.

The pressure-sensitive resistor assembly 304 comprises four pressure-sensitive resistive layers 309 mounted on an upper surface of a thin insulating sheet 308. The pressure-sensitive resistive layers 309 are vertically aligned with the respective control buttons 301, the respective upper walls of the resilient pads 302a, and the respective movable contacts 305. The pressure applied to one of the control buttons 301 is transmitted via the upper wall of the corresponding resilient pad 302a and the corresponding movable contact 305 to the corresponding pressure-sensitive resistive layer 309.

Each of the pressure-sensitive resistive layers 309 may be made of pressure-sensitive electrically conductive rubber, and has a pair of electrodes 309a, 309b at respective diametrically opposite ends thereof. The electric resistance of the pressure-sensitive resistive layer 309 between the electrodes 309a, 309b varies depending on the pressure acting on the pressure-sensitive resistive layer 309, and hence can produce a multigradation output from the electrodes 309a, 309b depending on the varying electric resistance of the pressure-sensitive resistive layer 309. The electrodes 309a, 309b are electrically connected to an internal circuit of the manual controller 200 which includes the A/D converter of the 4-bit resolution.

Therefore, the manual controller 200 is capable of producing multigradation outputs using entirely or partly the resolution of the A/D converter, and also of producing binary outputs using the LSB of the digital signal produced by the A/D converter.

In order to allow the manual controller 200 to function as master compatible devices with respect to manual controllers (also referred to as "partly compatible manual controllers" or "slave manual controllers") that are presently commercially available or used at home which is free of the joystick control units 241, 242 and capable of producing only binary outputs, the plug 203 (see FIG. 1) of the manual controller 200 is pin-compatible with those slave manual controllers that are presently commercially available or used at home, so that the manual controller 200 can be replaced with a slave manual controller.

Figure 5:
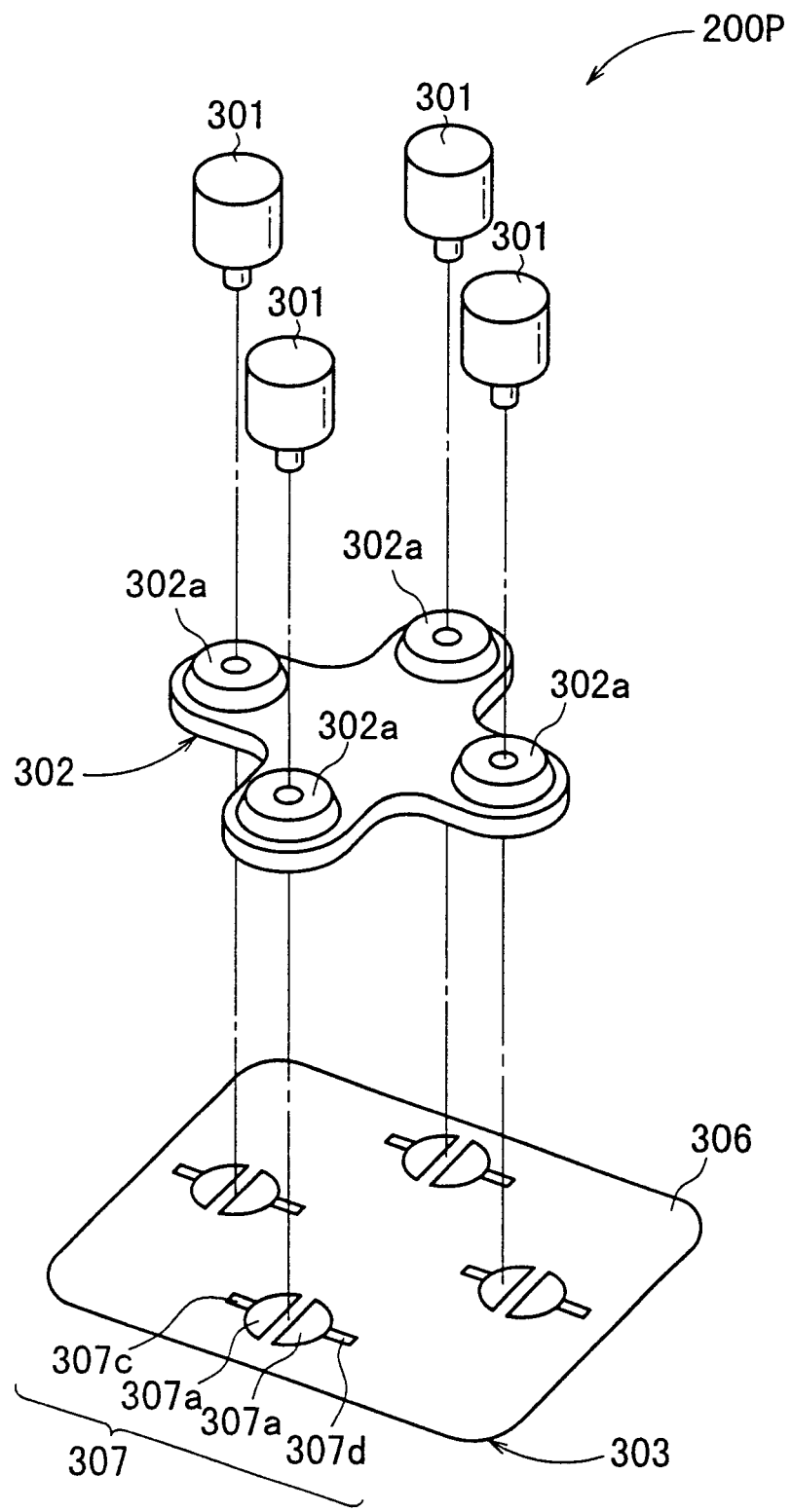
FIG. 5 is an exploded perspective, partly omitted from illustration, of a control unit capable of producing binary outputs.

FIG. 5 shows in exploded perspective a control unit, corresponding to the second control unit 220, of a slave manual controller 200P which is capable of producing only binary outputs as control information.

Figure 6:
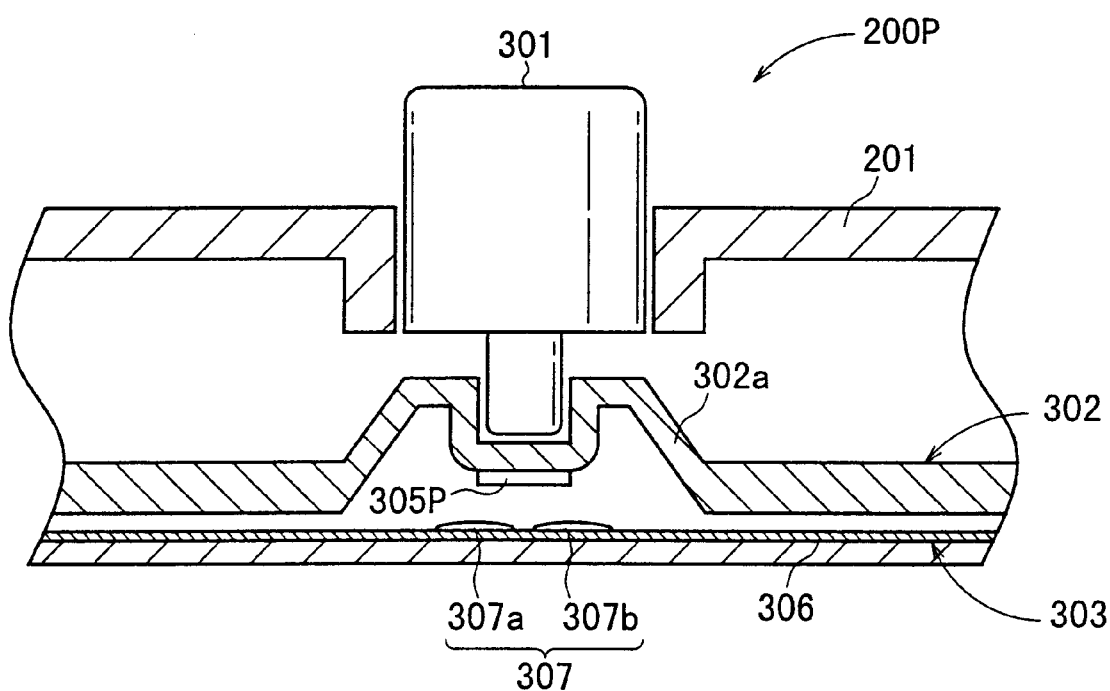
FIG. 6 is an enlarged fragmentary cross-sectional view of the control unit capable of producing binary outputs.

FIG. 6 shows in fragmentary cross section the control unit, corresponding to the second control unit 220, of the slave manual controller 200P.

According to the present embodiment, the slave manual controller 200P has an outer shape identical to that of the manual controller 200. Though the slave manual controller 200P and the manual controller 200 are identical in shape to each other, they may be made visually distinguishable by different colors, different labels, or different type numbers, etc. thereon.

For an easier understanding, those parts of the slave manual controller 200P which are identical to those of the manual controller 200 are denoted by identical reference characters, and will not be described in detail below.

As shown in FIGS. 5 and 6, the slave manual controller 200P has a fixed switch contact assembly 303 in place of the pressure-sensitive resistor assembly 304 of the manual controller 200. As shown in FIG. 6, each of the resilient pads 302a has an electrically conductive contact 305P, rather than the insulating movable contact 305P, supported on an inner surface thereof.

The fixed switch contact assembly 303 comprises four fixed contact sets 307 mounted on an upper surface of a thin flexible sheet 306 such as a membrane. Each of the fixed contact sets 307 comprises first and second fixed contacts 307a, 307b spaced from each other, and is disposed in vertical alignment with one of the movable contacts 305P.

When one of the control buttons 301 is pressed, the movable contact 305P on the upper wall of the corresponding resilient pad 302a moves downwardly into contact with the first and second fixed contacts 307a, 307b of the corresponding fixed contact set 307, electrically connecting the first and second fixed contacts 307a, 307b to each other. Each of the fixed contact sets 307 also has a pair of electrodes 309c, 307d at respective diametrically opposite ends of the first and second fixed contacts 307a, 307b. The electrodes 307c, 307d are electrically connected to an internal circuit of the slave manual controller 200P, so that the internal circuit can produce a binary output of control data.

Figure 7:
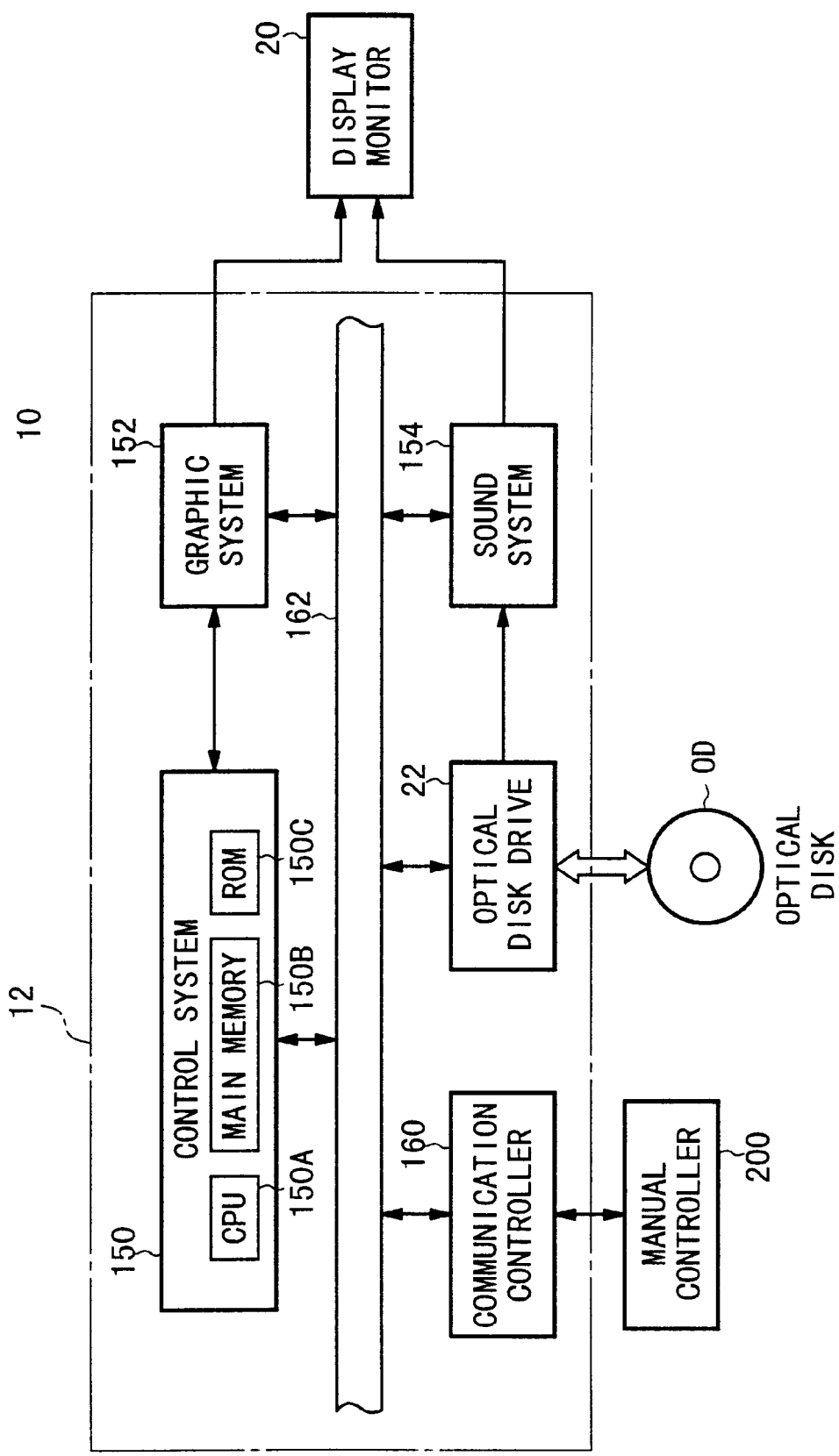
FIG. 7 is a block diagram of an electric circuit arrangement of the entertainment system shown in FIG. 1.

FIG. 7 shows in block form an electric circuit arrangement of the entertainment system 10, which includes an electric circuit arrangement of the entertainment apparatus 12 shown in FIG. 1.

As shown in FIG. 7, the entertainment apparatus 12 basically comprises a control system 150 including a central processing unit (CPU) 150A functioning as a transmission definition indication data transmitting means and peripheral devices thereof, a graphic system 152 including a frame buffer (not illustrated) and a graphic processing unit (GPU) for calculating, rendering, and storing images in the frame buffer, a sound system 154 including a sound processing unit (SPU) for generating music sounds and sound effects, the optical disk drive 22 functioning as a reading device for controlling the readout of the optical disk OD in which application programs and data are stored, a communication controller 160 for controlling communications with the manual controller 200 and a non-illustrated memory card, and a bus 162 to which the control system 150, the graphic system 152, the sound system 154, the optical disk drive 22, and the communication controller 160 are connected. The graphic system 152 and the sound system 154 has respective output terminals connected to the display monitor 20.

The control system 150 has the CPU 150A, a main memory 150B comprising a random-access memory (RAM), a read-only memory (ROM) 150C storing a system program such as an operating system for managing the main memory 150B, the graphic system 152, and the sound system 154, and a peripheral device controller (not shown) for controlling interrupts and direct memory access (DMA) transfer.

The graphic system 152 comprises a geometric transfer engine (GTE) for processing coordinate transformations, etc., the GPU for rendering images according to a rendering command from the CPU 150A, the frame buffer for storing images rendered by the GPU, and an image decoder for decoding image data which has been compressed and coded by orthogonal transform such as discrete cosine transform.

The optical disk drive 22 comprises an optical disk device for reproducing programs and data recorded in the optical disk OD, a decoder for decoding programs and data recorded with an added error-correcting code, and a buffer for temporarily storing data read from the optical disk device to speed up the readout of data from the optical disk OD.

The communication controller 160 controls communications between the manual controller 200 and the CPU 150A via the bus 162.

Figure 8:
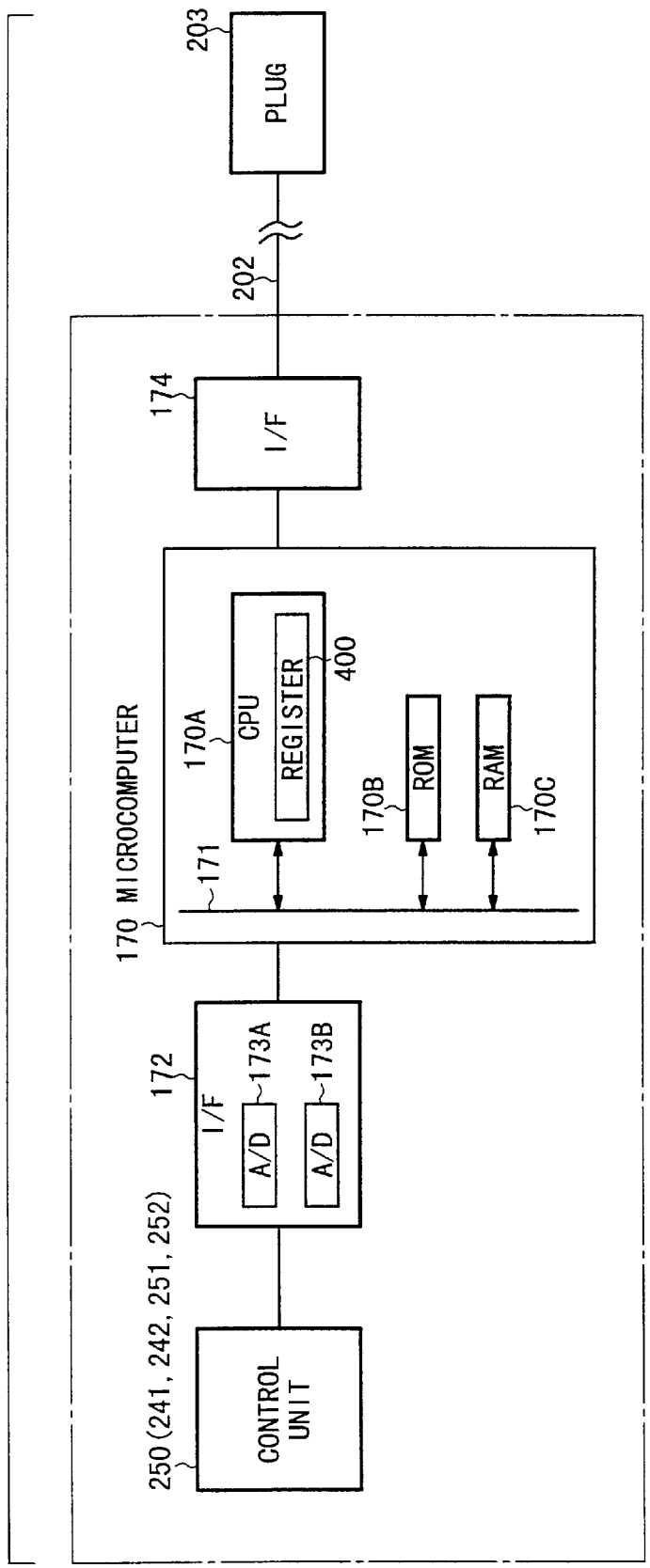
FIG. 8 is a block diagram of an electric circuit arrangement of the manual controller of the entertainment system shown in FIG. 1.

FIG. 8 shows in block form an electric circuit arrangement of the manual controller 200 that is connected to the jack 16A or 16B of the entertainment apparatus 12 by the connecting cord 202 and the plug 203.

As shown in FIG. 8, the manual controller 200 has a microcomputer 170 including a CPU 170A, a ROM 170B, and a RAM 170C which are connected to a bus 171, an interface 172 having 12 A/D converters 173A of the 4-bit resolution and 4 A/D converters 173B of the 8-bit resolution, and the control units 250 including the multigradation-output control units 241, 242, 251 and the binary-output control units 252. The control units 250 are connected to the microcomputer 170 via the interface 172.

The 12 A/D converters 173A are connected to respective output terminals of the control units 251 for producing 4-bit multigradation outputs, i.e., the first control unit 210 having the first through fourth control buttons 211, 212, 213, 214, the second control unit 220 having the fifth through eighth control buttons 221, 222, 223, 224, the R buttons 234, and the L buttons 235, and supply 4-bit multigradation outputs to the microcomputer 170. The 4 A/D converters 173B are connected to respective output terminals of the joystick control units 241, 242, and supply 8-bit multigradation outputs to the microcomputer 170.

The plug 203 is connected to the microcomputer 170 by the connecting cord 202 and the interface 174. In FIG. 1, the plug 203 is shown as being connected to the lower jack 16B of the entertainment apparatus 12.

The CPU 170A incorporates therein a button information register 400 as a storage unit for storing transmission definition indication data defining the types of control data to be transmitted from the manual controller 200 to the entertainment apparatus 12.

Figure 9:
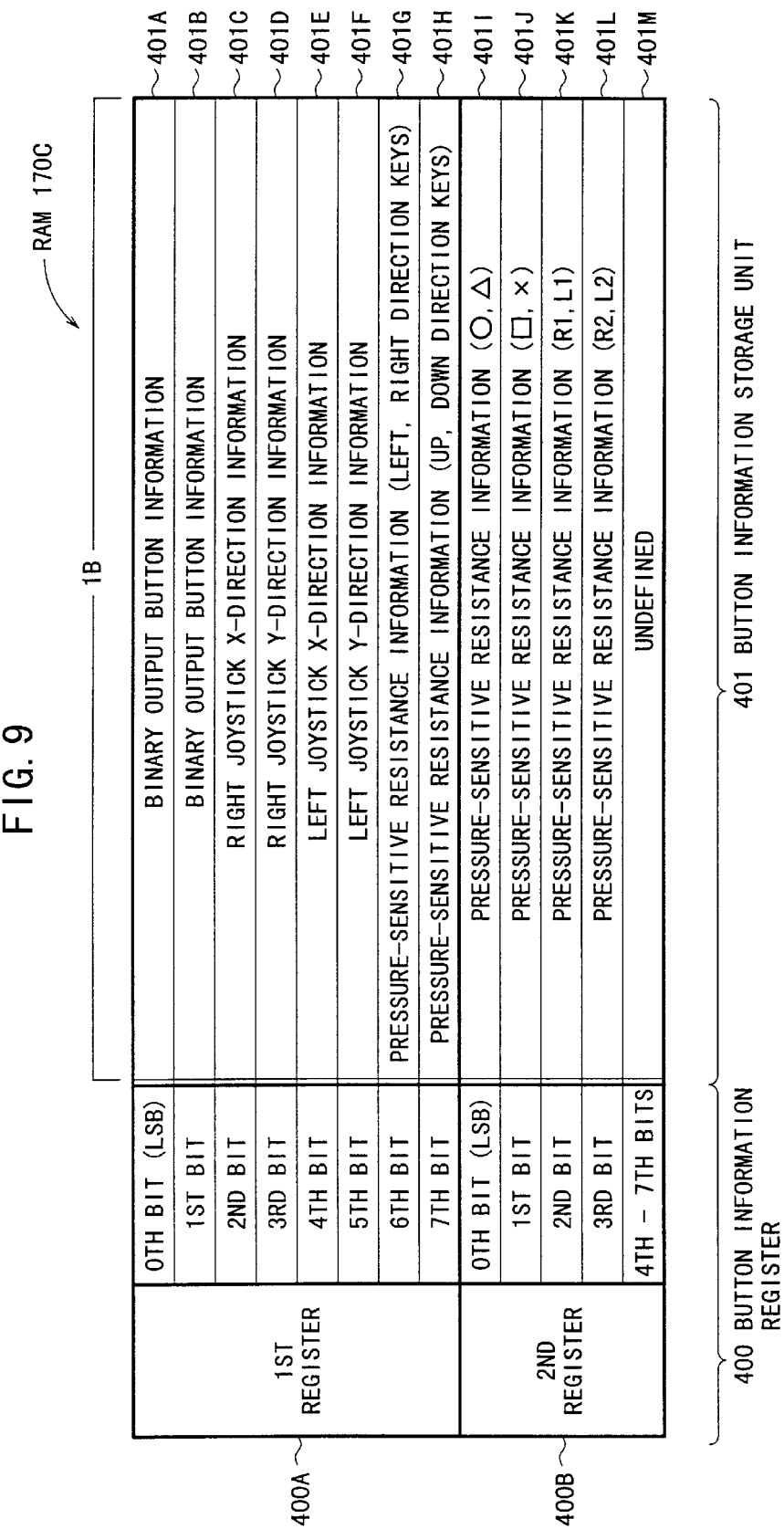
FIG. 9 is a diagram showing details of a button information register.

FIG. 9 shows showing details of the button information register 400.

As shown in FIG. 9, the button information register 400 has first and second button information registers (also referred to as "first and second registers") 400A, 400B each of 1 bytes or 8 bits.

1st (LSB) through 7th (MSB) bits of the first button information register 400A correspond to one byte of button information (information of control data), and 1st (LSB) through 7th (MSB) bits of the second button information register 400B also correspond to one byte of button information (information of control data). These bytes of button information are stored at respective addresses in the RAM 170C (hereinafter referred to as "button information storage unit 401" which comprises button information storage units 401A through 401M). The bytes of button information may alternatively be stored in another storage unit of the button information register 400.

The button information storage units 401A, 401B corresponding to the 0th and 1st bits of the first button information register 400A store on-off information, i.e., binary information, of the 15 control units, i.e., the 12 control units 251 and the 3 control units 252.

The button information storage units 401C–401F corresponding to the 2nd through 5th bits of the first button information register 400A store respective 8-bit X-direction information and 8-bit Y-direction information of the joystick control unit 242 and respective 8-bit X-direction information and 8-bit Y-direction information of the joystick control unit 241, which are represented by the outputs from the 4 A/D converters 173B.

The button information storage units 401G–401L corresponding to the 6th and 7th bits of the first button information register 400A and the 0th through 3rd bits of the second button information register 400B store respective 4-bit information that represents pressure-sensitive resistance information of the 12 control units 251.

Specifically, the 4-bit information that represents pressure-sensitive resistance information of the control buttons 211, 212 is stored in the button information storage unit 401G. The 4-bit information that represents pressure-sensitive resistance information of the control buttons 213, 214 is stored in the button information storage unit 401H. The 4-bit information that represents pressure-sensitive resistance information of the control buttons 221, 223 is stored in the button information storage unit 401I. The 4-bit information that represents pressure-sensitive resistance information of the control buttons 222, 224 is stored in the button information storage unit 401J. The 4-bit information that represents pressure-sensitive resistance information of R (R1) button 234 and the L (L1) button 235 is stored in the button information storage unit 401K. The 4-bit information that represents pressure-sensitive resistance information of R (R2) button 234 and the L (L2) button 235 is stored in the button information storage unit 401L. The button information storage unit 401 M corresponding to the 4th through 7th bits of the second button information register 400B are undefined, i.e., are reserved.

Operation of the entertainment system 10 thus constructed will be described in detail below.

Figure 10:
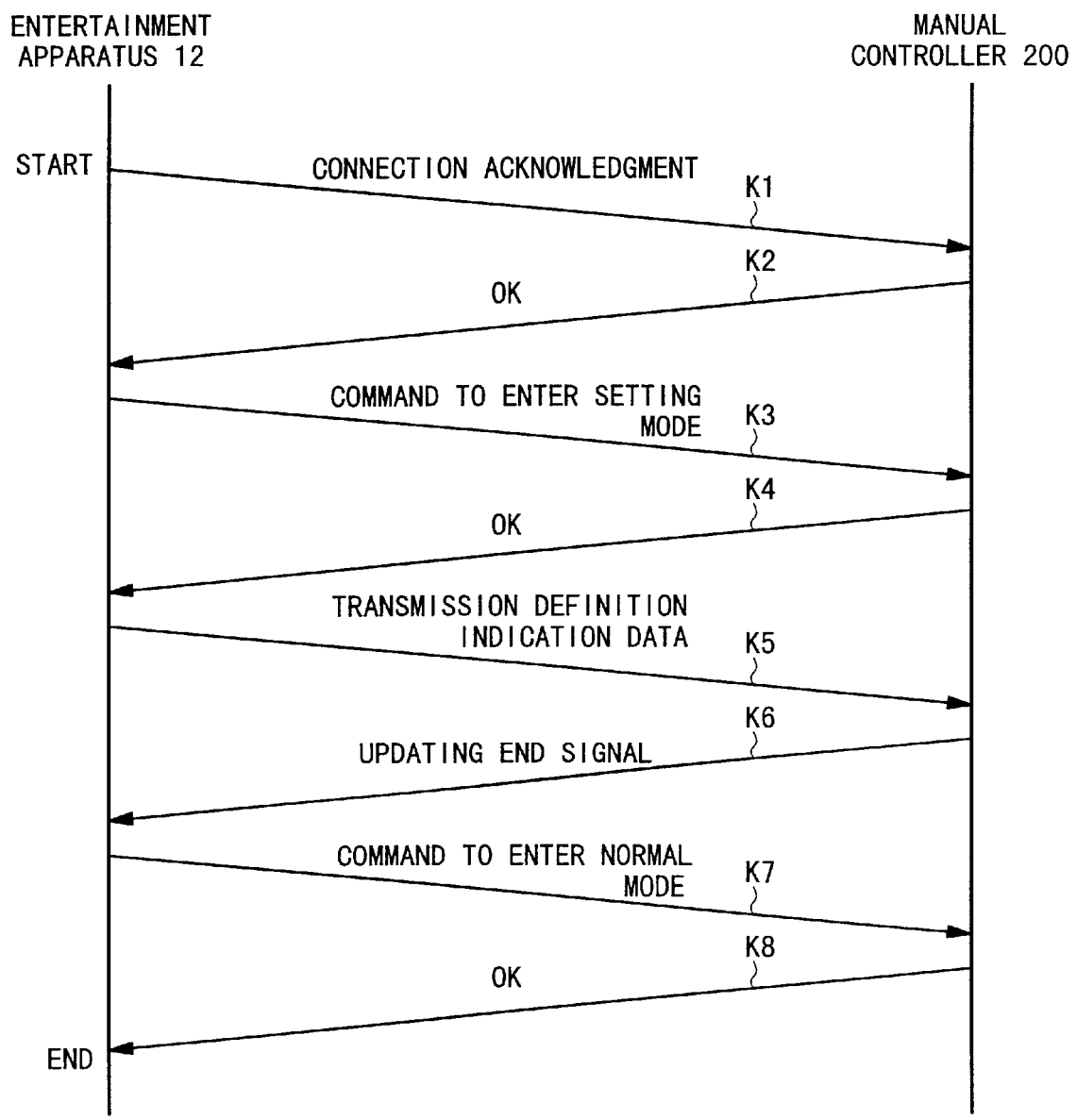
FIG. 10 is a sequence diagram illustrative of the manner in which the button information register is set and updated.

FIG. 10 is a sequence diagram illustrative of the operation of a device driver for the manual controller 200 to perform communications between the entertainment apparatus 12 and the manual controller 200.

Figure 11:
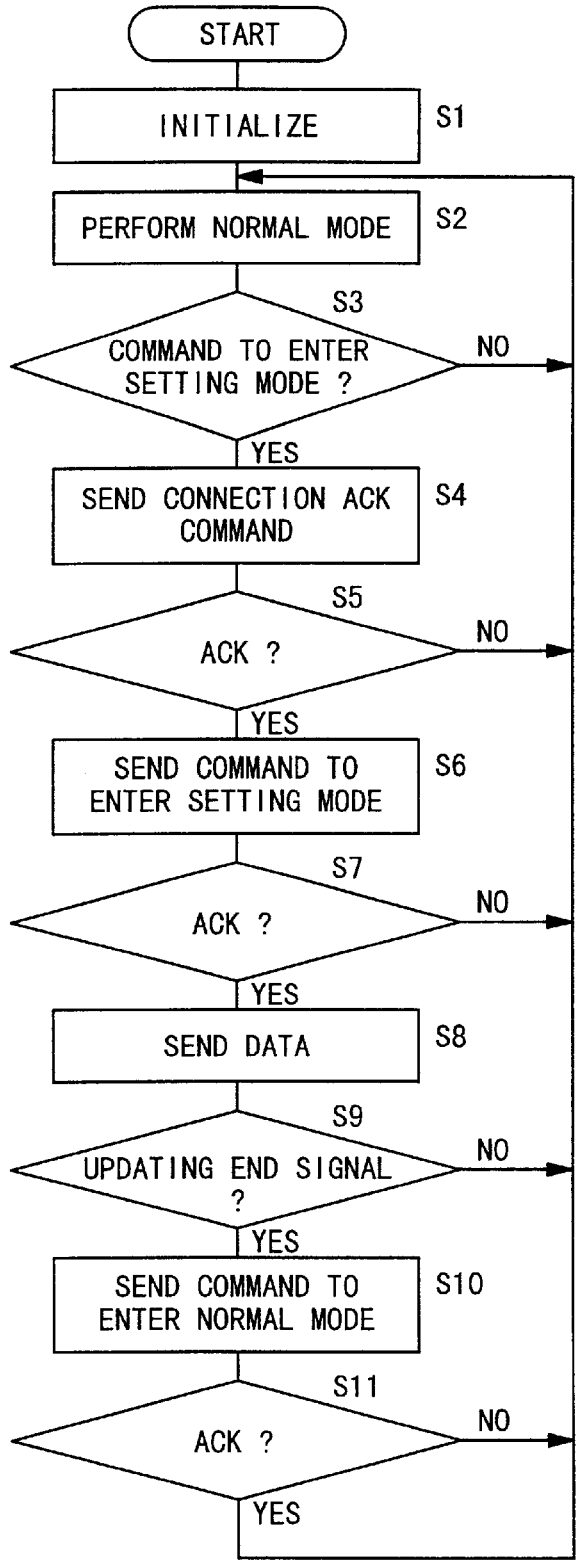
FIG. 11 is a flowchart of a processing sequence of an entertainment apparatus for setting and updating the button information register.

FIG. 11 shows a processing sequence of the CPU 150A of the entertainment apparatus 12 with respect to the operation of the device driver.

Figure 12:
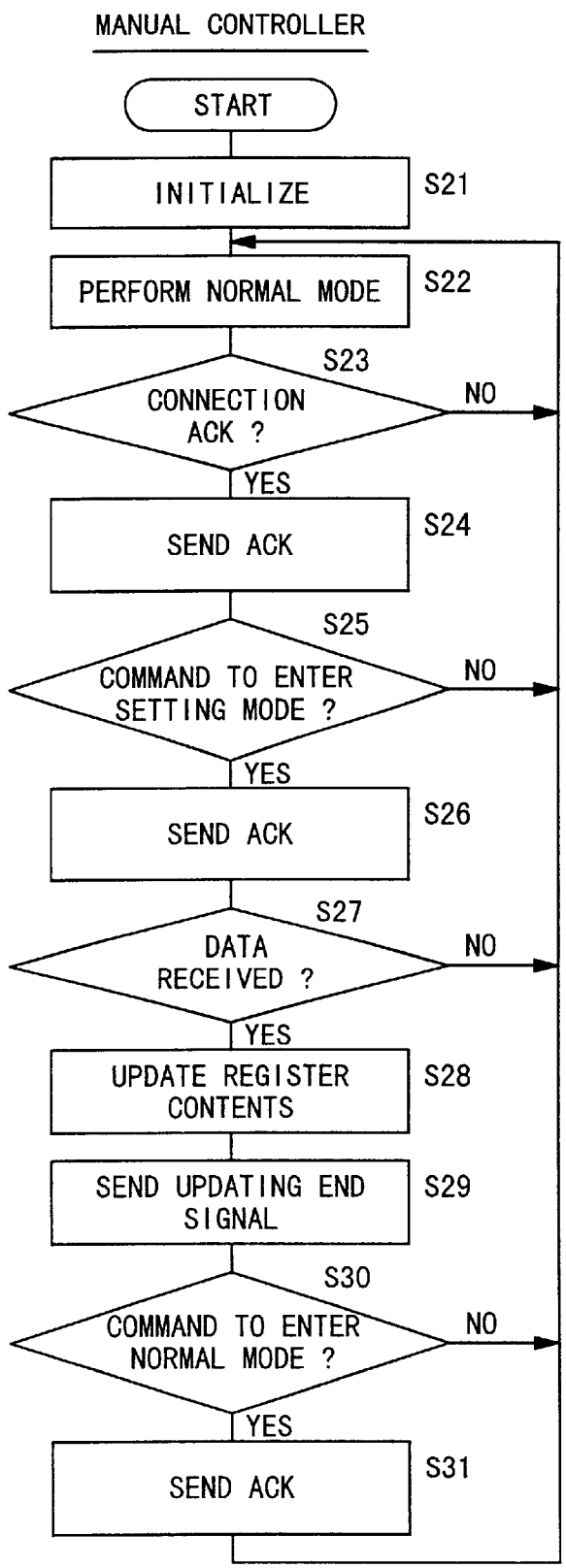
FIG. 12 is a flowchart of a processing sequence of the manual controller for setting and updating the button information register.

FIG. 12 shows a processing sequence of the CPU 170A of the manual controller 200 with respect to the operation of the device driver.

When the user inserts the plug 203 of the manual controller 200 into the jack 16B of the entertainment apparatus 12 with the power supply switch 28 turned off, the entertainment apparatus 12 and the manual controller 200 are connected to each other. The plug 203 of the manual controller 200 may be inserted into the jack 16A.

When the user presses the lid opening button 30, the lid of the disk loading unit 24 is opened. The user then inserts a desired optical disk OD into the disk loading unit 24, and closes the lid.

In the present embodiment, the optical disk OD as a recording medium stores application programs, data, and a device driver for the manual controller 200. The device driver for the manual controller 200 is a program used to control communications with the manual controller 200 and make the manual controller 200 usable.

When the user presses the power supply switch 28, the entertainment apparatus 12 is initialized in step S1 shown in FIG. 11. The entertainment apparatus 12 also supplies electric power to the manual controller 200, which is initialized in step S21 shown in FIG. 12.

According to the initializing processing in step S1, the CPU 150A of the control system 150 of the entertainment apparatus 12 executes an operating system stored in the ROM 150C to make it possible to control the graphic system 152 and the sound system 154. The CPU 150A also reads the device driver for the manual controller 200 from the optical disk OD into the main memory 150B.

The device driver may be stored in advance as part of a BIOS (Basic I/O System) in the ROM 150C, and may be executed when the entertainment apparatus 12 is turned on.

Alternatively, the entertainment apparatus 12 may have a wireless communication capability or an ability to connect to a public network, so that it can download the device driver from a broadcasting station or via the Internet.

Then, the CPU 150A refers to the device driver stored in the main memory 150B, or preferentially refers to the device driver stored in the ROM 150C if it has been stored in advance in the ROM 150C, and carries out a sequence operation shown in FIG. 10 based on the device driver in order to initialize the 0th–7th bits of each of the first and second button information registers 400A, 400B.

First, as shown in FIG. 10, the CPU 150A sends a connection acknowledgment command in a sequence step K1 via the communication controller 160 to the manual controller 200.

When the manual controller 200 receives the connection acknowledgment command in step S21, the manual controller 200 sends an acknowledgment (ACK) signal indicating that the connection of the manual controller 200 to the entertainment apparatus 12 is normal (OK) to the entertainment apparatus 12 in a sequence step K2.

In response to the acknowledgment (ACK) signal from the manual controller 200, the entertainment apparatus 12 sends a first command to enter a setting mode for setting the button information register 400 (400A, 400B) to the manual controller 200 in a sequence step K3.

In response to the command to enter the setting mode, the manual controller 200 sends an acknowledgment (ACK) signal indicating that the entry into the setting mode is accepted (OK) to the entertainment apparatus 12 in a sequence step K4.

In response to the acknowledgment (ACK) signal from the manual controller 200, the entertainment apparatus 12 sends initial transmission definition indication data Db defining a type of control data to be outputted from the manual controller 200, as default data representing attributes when none is explicitly specified, to the manual controller 200 in a sequence step K5.

The initial transmission definition indication data Db sent as default data are Db={the first button information register 400A {0th, 1st, 2nd, 3rd, 4th, 5th, 6th, 7th bits), the second button information register 400B {0th, 1st, 2nd, 3rd, 4th, 5th, 6th, 7th bits)=(00111111, 11111111)=(3f, ff)h in negative logic. (, )h represents a hexadecimal notation.

The initial transmission definition indication data Db are set and stored in the first button information register 400A and the second button information register 400B. According to this initial setting, only the data of 2 bytes in the button information storage units 401A, 401B which correspond to the 0th and 1st bits of the first button information register 400A are used as control data to be outputted from the manual controller 200.

When the initial transmission definition indication data Db=(3f, ff)h are stored in the first and second button information registers 400A, 400B, the manual controller 200 sends an acknowledgment (ACK) signal as an updating end signal, here an initialization end signal, to the entertainment apparatus 12 in a sequence step K6.

In response to the acknowledgment (ACK) signal as an updating end signal, the entertainment apparatus 12 sends a command to enter a normal mode to finish the initializing process to the manual controller 200 in a sequence step K7.

Then, the manual controller 200 sends an acknowledgment (ACK) signal that acknowledges the command to enter the normal mode to the entertainment apparatus 12 in a sequence step K8. Now, the initializing process in steps S1, S21 of the manual controller 200 and the entertainment apparatus 12 is finished.

According to the initializing process of the sequence steps K1–K8 in steps S1, S21 at the time the entertainment apparatus 12 is turned on, the default values set in the button information register 400 (400A, 400B) correspond to the pin-compatible slave manual controller 200P. Since the manual controller 200 is set to output only the same control data as the control data outputted from the slave manual controller 200P in the initializing process, the manual controller 200 can be used in placed of the slave manual controller 200P.

After the initializing process in steps S1, S21, the entertainment apparatus 12 performs the processing of a normal mode in step S2, and the manual controller 200 also performs the processing of a normal mode in step S22.

In the normal mode, the entertainment apparatus 12 reads an application program from the optical disk OD and executes the read application program. As the application program is executed, when the user operates the control units 250 of the manual controller 200 while viewing images displayed on the display screen of the display monitor 20, only the control data according to "0" (the effective bits represent "0" rather than "1" because of the negative logic) in the bits of the first and second button information registers 400A, 400B, specifically, only the control data (binary-output button information) of 2 bytes or 16 bits stored in the button information storage units 401A, 401B corresponding to the 0th bit="0" and the 1st bit=" " immediately after the initializing process, are transmitted from the manual controller 200 to the entertainment apparatus 12 during the time ta for communications with the manual controller 200 (see the upper sequence 1 in FIG. 19).

More specifically, in the normal mode subsequent to the initializing process, only on-off information (binary output information) of the 12 control units 251 including the control buttons 211–214, 221–224, 234, 235 is transmitted to the entertainment apparatus 12.

The button information register 400 (400A, 400B) and the CPU 170A of the manual controller 200 function as a control data transmission defining means for defining a type of control data to be outputted to the entertainment apparatus 12 which is an external apparatus as seen from the manual controller 200. Since instructions from the entertainment apparatus 12 are externally inputted instructions as seen from the manual controller 200, the button information register 400 (400A, 400B) and the CPU 170A may also be regarded as a control data transmission defining means for defining a type of control data to be outputted from the manual controller 200 in response to externally inputted instructions.

In step S3 shown in FIG. 11, the CPU 150A of the entertainment apparatus 12 confirms whether there is a command for entering a setting mode to update (change) the content of the transmission definition indication data Db in the application program while the application program is being executed. A command for entering a setting mode is issued when situations change or levels of complexity changes while a game program, for example, is being executed.

If there is not a command for entering a setting mode in step S3, then the normal mode is repeatedly processed in step S2.

If the CPU 150A confirms a command for entering a setting mode in the application program that is being presently executed, then the CPU 150A updates the contents of the bits of the button information register 400 to update (change) the content of the transmission definition indication data Db according to the sequence shown in FIG. 10 in the same manner as with the initializing process described above.

Specifically, in step S3, the CPU 150A refers to the device driver for the manual controller 200 which ,is stored in the main memory 150B. Then, the CPU 150A sends a connection acknowledgment command in the sequence step K1 to the manual controller 200 in step S4 in order to update the contents of the 0th–7th bits of the first and second button information registers 400A, 400B.

If the manual controller 200 confirms the connection acknowledgment command from the entertainment apparatus 12 in step S23 shown in FIG. 12, then the manual controller 200 sends an acknowledgment (ACK) signal to the entertainment apparatus 12 in the sequence step K2 in step S24.

If the entertainment apparatus 12 receives the acknowledgment (ACK) signal in step S5, then the entertainment apparatus 12 sends a command for entering a setting mode to set the button information register 400 (400A, 400B) to the manual controller 200 in the sequence K3 in step S6.

If the manual controller 200 confirms the reception of the command for entering the setting mode in step S25, then the manual controller 200 sends an acknowledgment (ACK) signal to the entertainment apparatus 12 in the sequence step K4 in step S26.

If the entertainment apparatus 12 receives the acknowledgment (ACK) signal in step S7, then the entertainment apparatus 12 sends updating transmission definition indication data Db indicated by the application program to the manual controller 200 in the sequence step K5 in step S8.

If the manual controller 200 receives the updating transmission definition indication data Db in step S27, then the manual controller 200 updates or changes the contents of the 0th–7th bits of the first and second button information registers 400A, 400B according to the updating transmission definition indication data Db in step S28.

If the updating transmission definition indication data Db represent (11111100, 00001111)=(fc, 0f)h, then the first button information register 400A (0th, 1st, 2nd, 3rd, 4th, 5th, 6th, 7th bits) is set to (0th, 1st, 2nd, 3rd, 4th, 5th, 6th, 7th bits)=(11111100), and the second first button information register 400B (0th, 1st, 2nd, 3rd, 4th, 5th, 6th, 7th bits) is set to (0th, 1st, 2nd, 3rd, 4th, 5th, 6th, 7th bits)=(00001111).

After the first and second button information registers 400A, 400B have been updated, the 0th and 1st bits of the first button information register 400A are disabled, and the 6th and 7th bits of the first button information register 400A and the 0th–3rd bits of the second button information register 400B are enabled. Therefore, the manual controller 200 changes its output function from the production of binary outputs to the production of multigradation outputs based on the pressure-sensitive resistance information.

After having updated the contents of the button information register 400 in step S28, the manual controller 200 sends an updating end signal to the entertainment apparatus 12 in the sequence step K6 in step S29.

If the entertainment apparatus 12 receives the updating end signal in step S9, then the entertainment apparatus 12 recognizes the end of the updating process, and sends a command to enter the normal mode to the manual controller 200 in the sequence step K7 in step S10.

If the manual controller 200 confirms the command to enter the normal mode in step S30, then the manual controller 200 sends an acknowledgment (ACK) signal to the entertainment apparatus 12 in the sequence step K8 in step S31. Thereafter, the manual controller 200 enters the normal mode in step 522.

If the entertainment apparatus 12 receives the acknowledgment (ACK) signal in the sequence step K8 in step S11, then the entertainment apparatus 12 enters the normal mode in step 52.

Figure 19:
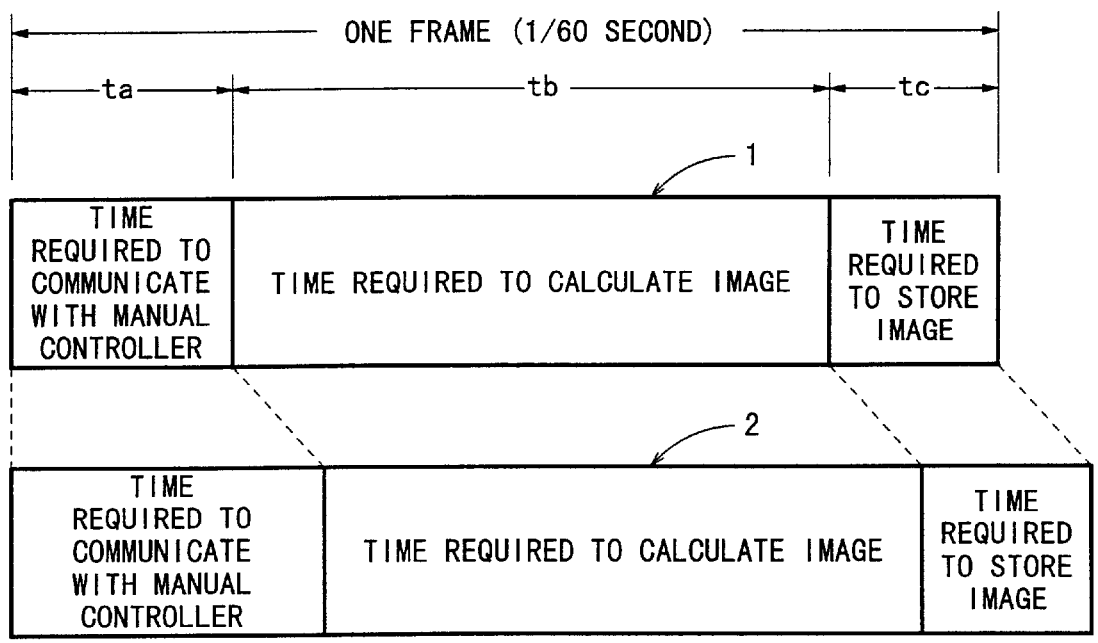
FIG. 19 is a diagram illustrative of processes performed during the period of one frame.

In the normal mode of the entertainment apparatus 12 and the manual controller 200, only the control data stored in the button information storage unit 401 corresponding to the enabled bits of the updated button information register 400, specifically, only the control data stored in the button information storage units 401G–401L, i.e., "pressure-sensitive resistance information (left and right buttons)", "pressure-sensitive resistance information (up and down buttons)", "pressure-sensitive resistance information (○, △buttons), "pressure-sensitive resistance information (□, x buttons), "pressure-sensitive resistance information (R1, L1 buttons), and "pressure-sensitive resistance information (R2, L2 buttons) are transmitted from the manual controller 200 to the entertainment apparatus 12 during the time ta for communications with the manual controller 200 (see the upper sequence 1 in FIG. 19).

Specifically, after the type of control data has been set in the button information register 400 of the manual controller 200 by the entertainment apparatus 12, the CPU 170A of the manual controller 200 transmits only the control data of the type set by the button information register 400 to the entertainment apparatus 12 in each frame during the time ta in the upper sequence 1 shown in FIG. 19. By thus limiting the type of control data that are transmitted, the time required to communicate between the manual controller 200 and the entertainment apparatus 12 is reduced.

In the above embodiment, even though the manual controller 200 has more control units 250 and more functions than the slave manual controller 200P, the number of control data transmitted from the manual controller 200 to the entertainment apparatus 12 can be limited to a predetermined number of control data that can be transmitted within the time ta for communications with the manual controller 200 as shown in the upper sequence 1 in FIG. 19, according to the program recorded in the optical disk OD, so that the time or baud rate for communications between the manual controller 200 and the entertainment apparatus 12 connected thereto does not need to be increased, and the manual controller 200 has a function to produce analog outputs, i.e., multigradation outputs, depending on the magnitude of the pressure acting on the control units.

In the above embodiment, each of the multigradation-output control units 251 produces a 4-bit output. However, each of the multigradation-output control units 251 may produce an 8-bit output as with the control units 241, 242.

The optical disk OD stores the device driver for the manual controller 200 as the program which comprises the step (sequence steps K1, K2) of confirming an electric connection to the manual controller 200, the step (sequence steps K3, K4) of entering from the normal mode into the setting mode (control data transmission defining mode) after the electric connection to the manual controller 200 is confirmed, the step (sequence steps K5, K6) of sending the transmission definition indication data Db defining a type of control data to be transmitted to the manual controller 200, and the step (sequence steps K7, K8) of causing the manual controller 200 to enter from the setting mode (control data transmission defining mode) into the normal mode. By having the entertainment apparatus 12 execute the device driver stored in the optical disk OD, it is possible to set and update a type of control data to be transmitted from the manual controller 200 when the application program is being executed as well as when the application program starts being executed.

If the optical disk OD stores a program which has, among the above steps, the step (sequence steps K1, K2) of confirming an electric connection to the manual controller 200 and the step (sequence steps K5, K6) of sending the transmission definition indication data Db defining a type of control data to be transmitted to the manual controller 200, then it is possible to set a type of control data to be transmitted from the manual controller 200 at least when the application program starts being executed.

Figure 13:
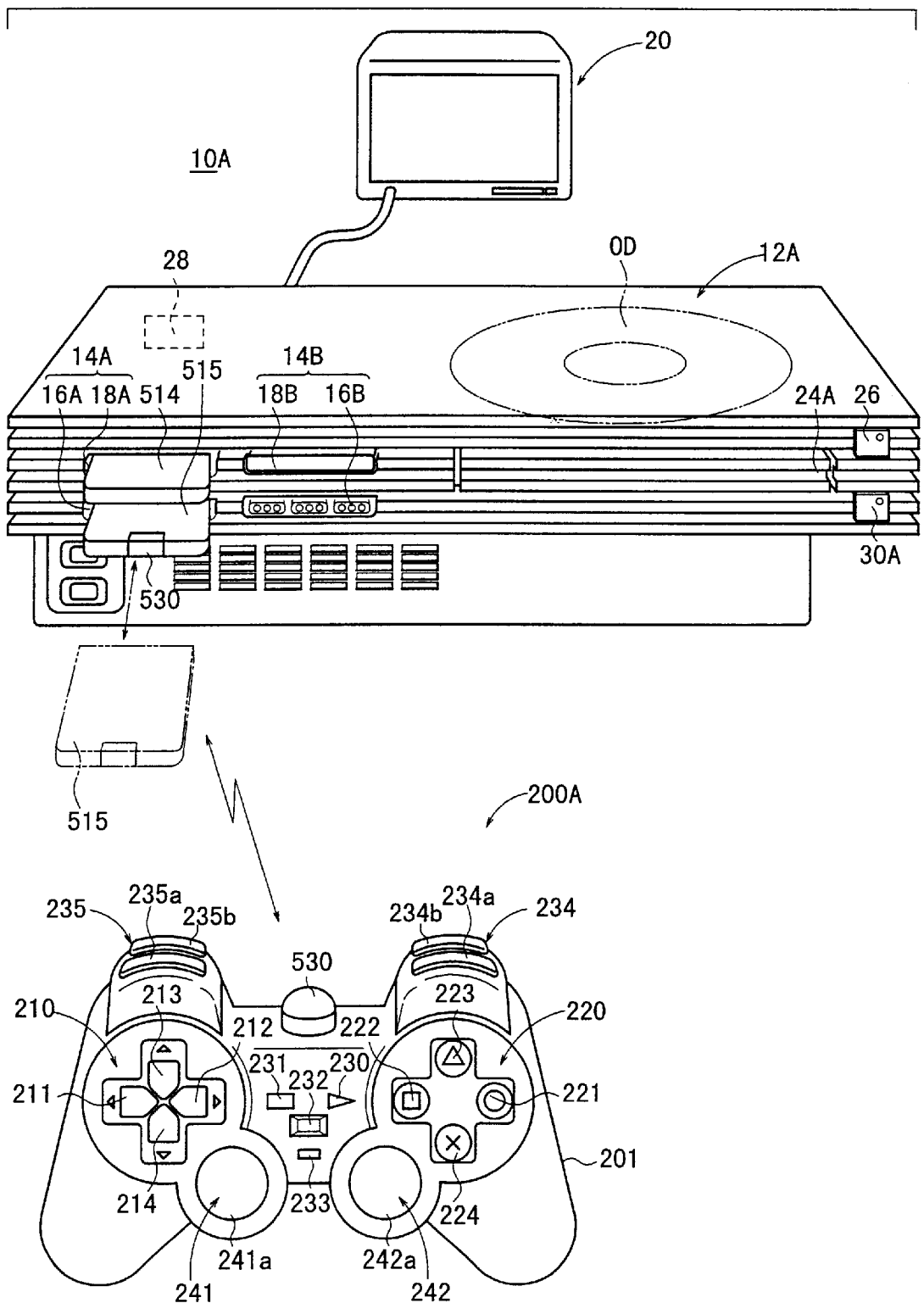
FIG. 13 is a perspective view of an entertainment system according to another embodiment of the present invention.

FIG. 13 shows in perspective an entertainment system 10A according to another embodiment of the present invention. Those parts of the entertainment system 10A which are identical to those of the entertainment system 10 according to the preceding embodiment are denoted by identical reference numerals or identical reference numerals with a suffix A, and will not be described in detail below.

As shown in FIG. 13, the entertainment system 10A comprises an entertainment apparatus 12A for executing various programs, a memory card 514 as a card-shaped external storage device (external memory) detachably connected to the entertainment apparatus 12A, a manual controller 200A for supplying control requests from the user or game player to the entertainment apparatus 12A in a wireless fashion via a relay device 515 that is detachably connected to the entertainment apparatus 12A, and a display monitor 20 such as a television receiver for being supplied with video and audio signals from the entertainment apparatus 12A and displaying images and outputting sounds.

The entertainment apparatus 12A has a casing substantially in the shape of a rectangular parallelepiped. The entertainment apparatus 12A has on the front panel of the casing a disk tray 24A movable into and out of the casing and serving as a display loading unit for loading an optical disk OD as a recording medium storing programs and data, a reset switch 26 for resetting a program that is being presently executed by the entertainment apparatus 12A, an open button 30A for moving the disk tray 24A out of the casing, a pair of upper jacks 18A, 18B for receiving the memory card 514, and a pair of lower jacks 16A, 16B for receiving the connector (plug) of the relay device 515. The entertainment apparatus 12A has on the rear panel of the casing a power supply switch 28 and AV (Audio Visual) multi-output terminals (not shown) as video and audio output terminals that are connected to the display monitor 20 via an AV cable.

The plug 203 of the manual controller 200 shown in FIGS. 1 and 2 can be inserted into either one of the jacks 16A, 16B. The relay device 515 shown in FIG. 13 may be inserted into either one of the jacks 16A, 16B of the entertainment apparatus 12 shown in FIG. 1, so that the wireless manual controller 200A can be used with the entertainment apparatus 12.

The entertainment apparatus 12A shown in FIG. 13 has various control functions including a control function to read a computer game (video game) program from the optical disk OD as a CD-ROM, DVD-ROM, etc. which stores such a computer game program and data, and execute the computer game program to display characters and scenes on the display monitor 20, a control function to play back movies recorded on other optical disks OD such as DVDs (Digital Video Disks), and a control function to play back music pieces recorded on optical disks OD such as CDDA (Compact Disk Digital Audio). The entertainment apparatus 12A also has a function to execute a program downloaded from a communication network. While the entertainment apparatus 12A is executing a game program, the display monitor 20 displays three-dimensional computer graphics images that are generated by the entertainment apparatus 12A.

Signals sent from the manual controller 200A to the entertainment apparatus 12A are processed by one of the above control functions of the entertainment apparatus 12A to move and change characters displayed on the display monitor 20 and change scenes displayed on the display monitor 20.

As described later on, the manual controller 200A also functions as a wireless remote controller for sending a playback command, a pause command, and a subtitle selection command to the entertainment apparatus 12A when a DVD or a CDDA is played back by the entertainment apparatus 12A.

The manual controller 200A has first and second control units 210, 220 disposed in left and right areas on the upper central surface of its casing 201, third and fourth control units 235, 234 disposed on the front side of the casing 201, and left and right joysticks 241, 242 disposed in left and right areas on the upper side surface of its casing 201 remote from the front side thereof.

The left and right joysticks 241, 242 are associated with respective actuators (not shown) comprising vibrating motors for imparting vibrations to the left and right joysticks 241, 242 according to the game program.

The first control unit 210 comprises a pressable control unit for moving characters displayed on the display screen of the display monitor 20, and its function is set by a program recorded in the optical disk OD. The first control unit 210 comprises four control buttons (also referred to as "control keys" or "direction keys") 211, 212, 213, 214 that the user or game player can press to move a displayed character upwardly, downwardly, leftwardly, and rightwardly on the display screen of the display monitor 20. The control button 211 is also referred to as a left direction key, the control button 212 a right direction key, the control button 213 an upward direction key, and the control button 214 a downward direction key.

The second control unit 220 has four control buttons 221, 222, 223, 224 each in the form of a pressable cylinder. The control buttons 221, 222, 223, 224 are marked respectively with "○", "□", "Δ", "x", and are also referred to as a ○ button, a □ button, a Δ button, and an x button.

Functions of the control buttons 221–224 of the second control unit 220 are set by the program recorded in the optical disk OD. For example, the control buttons 221–224 are allocated respective functions to move the left arm, the right arm, the left leg, and the right leg of the displayed character, for example.

The third and fourth control units 235, 234 are identical in structure to each other, and have two upper and lower pressable control buttons (L1, L2 buttons) 235a, 235b and two upper and lower pressable control buttons (R1, R2 buttons) 234a, 234b, respectively. Functions of the third and fourth control units 235, 234 are also set by the program recorded in the optical disk OD. For example, the third and fourth control units 235, 234 are allocated a function to impart special motions to displayed characters and a function to change displayed characters.

The left and right joystick control units 241, 242 are combined with respective signal input devices such as rheostats which can be swiveled 360° about their shafts. The left and right joystick control units 241, 242 can be returned to their neutral position by resilient members (not shown). In the neutral position, the left and right joystick control units 241, 242 serve as fifth and sixth pressable control units comprising control buttons (L3, R3 buttons) 241a, 242a, respectively.

When the left and right joystick control units 241, 242 are swiveled, they enter command signals to cause a displayed character to make an analog action, i.e., to move the displayed character while rotating same, or move the displayed character at a varying speed, or change states of the displayed character. In the present embodiment, when the user operates the left joystick 241, the displayed character can move in the direction indicated by an arrow cursor, as described later on.

Figure 14:
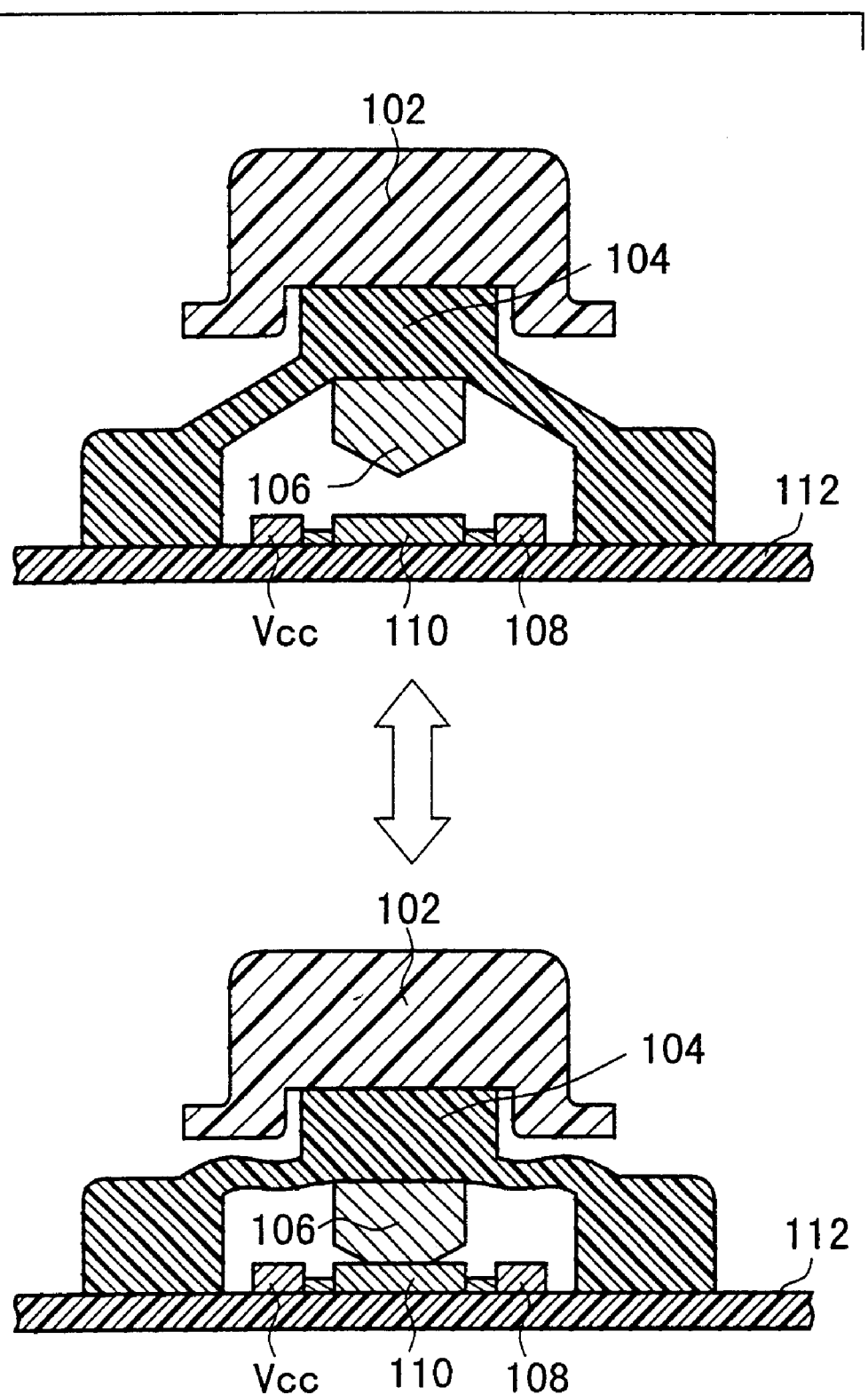
FIG. 14 is a cross-sectional view of another control unit capable of producing multigradation outputs.

FIG. 14 shows in cross section an internal structure of a portion of the manual controller 200A.

In FIG. 14, a control button 102 represents each of the direction keys 211–214 of the first control unit 210, each of the control buttons 221–224 of the second control unit 220, each of the L1, L2 buttons 235a, 235b, the R1, R2 buttons 234a, 234b of the third and fourth control units 235, 234, and each of the control buttons 241a, 242a of the fifth and sixth control units. A resilient electrically conductive member 106 having a downwardly tapered shape is attached to the lower surface of the control button 102 by an insulating resilient pad 104. A resistive layer (resistor) 110 is disposed downwardly of the resilient electrically conductive member 106 in vertical alignment therewith. The resistive layer 110 has an end connected to a voltage source having a voltage Vcc via a pattern and the other end connected to an end of a fixed resistive layer (resistor) 108 via a pattern. The resistive layers 110, 108 are disposed on an insulating board 112. The other end of the fixed resistive layer 108 is connected to ground.

Figure 15:
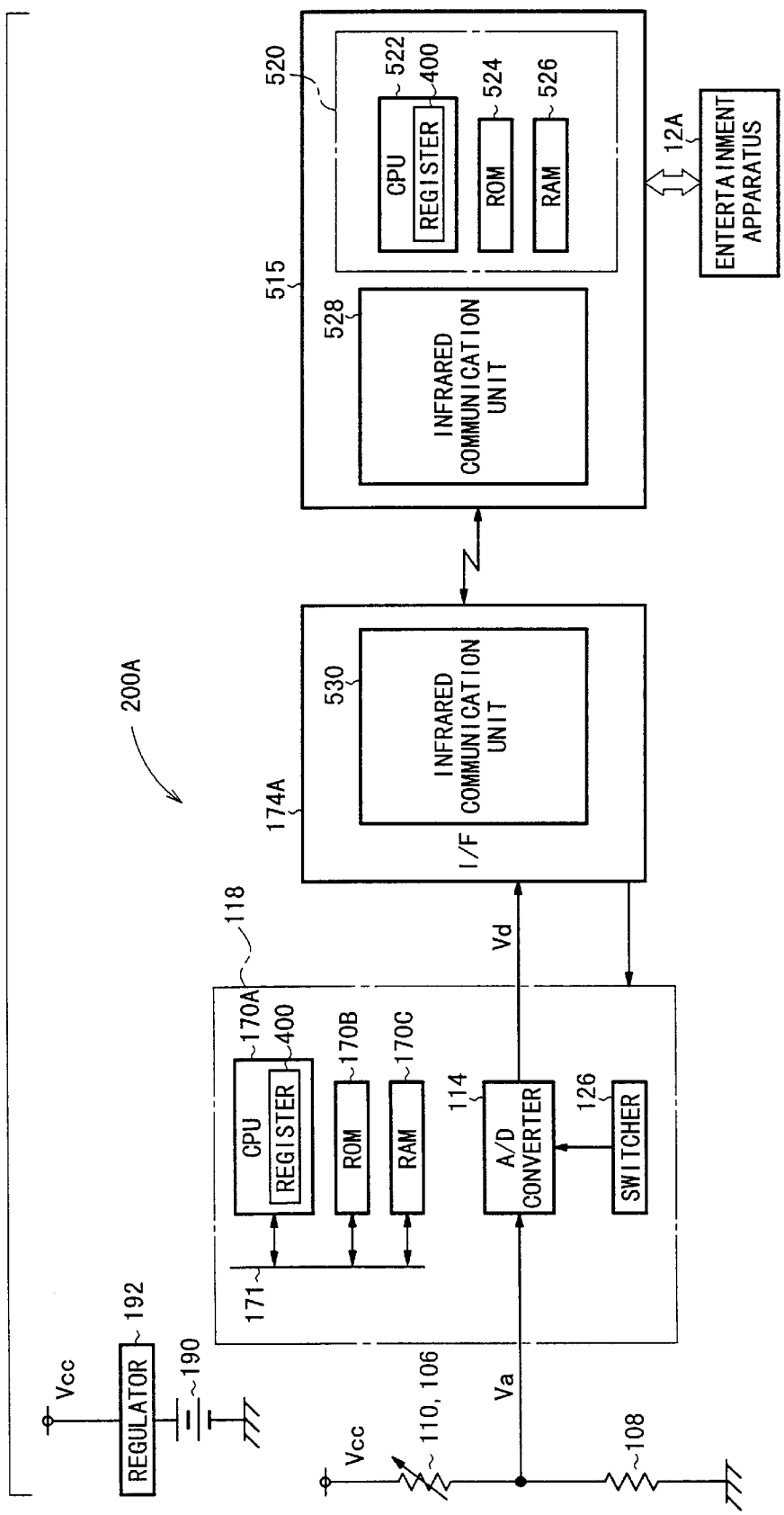
FIG. 15 is a block diagram of an electric circuit arrangement of major components of a relay device and a manual controller in the entertainment system shown in FIG. 13.

FIG. 14 shows the manner in which the control unit operates as a pressure-sensitive element for producing a signal output proportional to the pressure applied thereto. FIG. 15 shows in block form an electric circuit arrangement of major components of the manual controller 200A and the relay device 515.

When the direction keys 211–214, the control buttons 221–224, the L1, L2 buttons 235a, 235b, the R1, R2 buttons 234a, 234b, and the control buttons 241a, 242a are pressed, i.e., when the control button 102 is pressed, the resilient electrically conductive member 106 is depressed into contact with the resistive layer 110. The resistance of the resistive layer 110 is apparently changed depending on the area of contact between the resilient electrically conductive member 106 and the resistive layer 110. As a result, a divided voltage (analog value) Va produced by the resistive layers 110, 108 is changed and applied as an input signal to an A/D converter 114 (see FIG. 15).

The resilient electrically conductive member 106 and the resistive layer 110 jointly make up a pressure-sensitive element whose electric resistance varies depending on the pressure applied from the control button 102. Therefore, the resistive layer 110 serves as a rheostat.

As shown in FIG. 15, the manual controller 200A has an MPU (MicroProcessor Unit) 118 as a control means which comprises a CPU 170A including a button information register 400 as a storage unit, a ROM 170B, and a RAM 170C that are connected to the CPU 170A by a bus 171.

The MPU 118 also has a switcher 126 whose operation is controlled by the CPU 170A, and the A/D converter 114. The switcher 126 serves to switch between different functions of the A/D converter 114, as described later on. An analog signal (voltage) Va outputted from the output terminal of the resistive layer 110 is supplied to the A/D converter 114, which converts the analog signal Va into a digital signal Vd.

The digital signal Vd outputted from the A/D converter 114 is applied to an interface (I/F) 174A mounted on an internal board of the manual controller 12A, and transmitted as a wireless infrared signal via the relay device 515 to the entertainment apparatus 12A. The digital signal Vd supplied to the entertainment apparatus 200A serves to move the displayed character, for example.

The manual controller 200A has a detachable battery 190 connected to a regulator 192 that serves as the voltage source. The regulator 192 generates the voltage Vcc that is supplied to various circuits in the manual controller 200A.

The relay device 515 has an MPU (MicroProcessor Unit) 520 as a control means which comprises a CPU 522 including a button information register 400 as a storage unit, a ROM 524, and a RAM 526 that are connected to the CPU 522. The MPU 520 has an infrared communication unit 528 (first wireless communication unit) that is controlled by the CPU 522 for its communicating operation.

The button information register 400 may be provided in either one of the manual controller 200A and the relay device 515.

The interface 174A of the manual controller 200A has an infrared communication unit 530 (second wireless communication unit) for performing infrared communications with the infrared communication unit 528 (first wireless communication unit) of the relay device 515. The manual controller 200A and the relay device 515 may perform radio-wave communications using a weak radio wave therebetween, rather than infrared communications.

A change in the level of the analog signal Va outputted from the output terminal of the resistive layer 110 is commensurate with a change in the pressure applied from the control button 102 by the user. Therefore, the digital signal Vd outputted from the A/D converter 114 is commensurate with the pressure applied from the control button 102 by the user. When the motion of a displayed game character, for example, is controlled by the digital signal Vd that is related to the pressure applied by the user, it is possible to achieve a smoother motion of the displayed game character than when the motion of the displayed game character is controlled by a binary digital signal of "1" or "0".

The manual controller 200A controls the switcher 126 via the interface 174A based on transmission definition indication data Db transmitted as a control signal from the entertainment apparatus 12A via the relay device 515 according to the program recorded in the optical disk OD.

Specifically, when the program recorded in the optical disk OD is executed, the entertainment apparatus 12A outputs the transmission definition indication data Db indicative of whether the A/D converter 114 functions as a means for outputting a multivalued digital signal Vd having one of values ranging from 0 to 255 or a means for outputting a binary digital signal Vd having a value "0" or "1", according to the program.

The transmission definition indication data Db is stored in the button information register 400 of the CPU 170A, for example. Based on the transmission definition indication data Db, the CPU 170A controls the switcher 126 to select one of the functions of the A/D converter 114 to produce either a binary output or a multivalued output. Consequently, whether the A/D converter 114 is to produce either a binary output or a multivalued output is determined by the program recorded in the optical disk OD.

In FIG. 13, either the left and right joysticks 241, 242 or the first and second control units 210, 220 are selected at a time by the mode selection switch 232. When the left and right joysticks 241, 242 are selected by the mode selection switch 232, the indicator 233 is turned on, indicating the selection of the left and right joysticks 241, 242.

The manual controller 200A further has a start switch 230 for instructing the entertainment apparatus 12A to start a game, and a selection switch 231 for selecting a level of difficulty of the game before the game is started.

An internal structure of the entertainment system 10A shown in FIG. 13 and its general operation will be described below with reference to FIG. 16.

Figure 16:
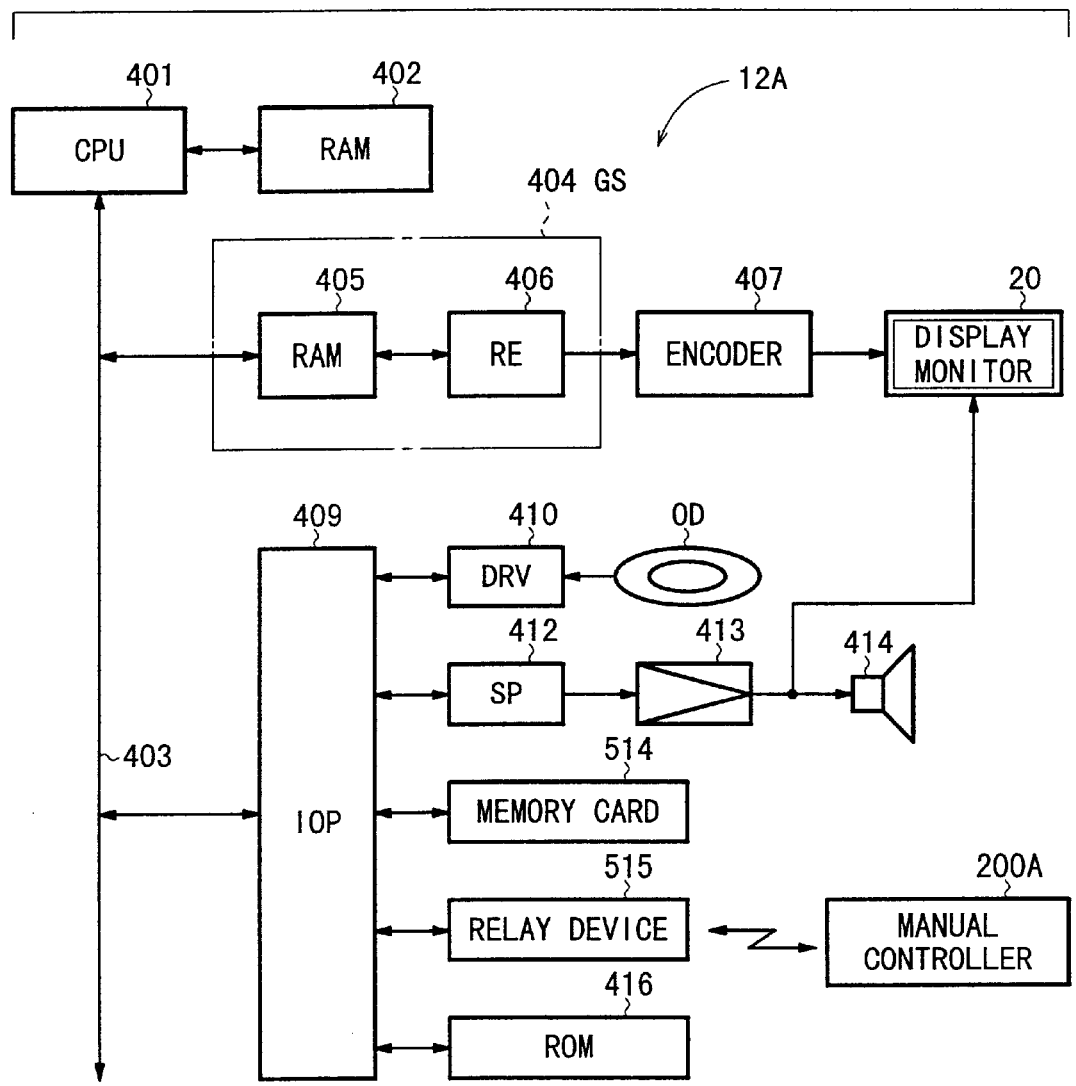
FIG. 16 is a block diagram of an electric circuit arrangement of the entertainment system shown in FIG. 13.

As shown in FIG. 16, the entertainment apparatus 12A has a CPU 401 as a means for executing a program, a RAM 402 as a semiconductor memory connected to the CPU 401, and a bus 403 connected to the CPU 401. The RAM 402 functions as a storage unit for successively storing programs and data recorded in the optical disk OD. The CPU 401 functions to execute programs read from the optical disk OD and stored in the RAM 402.

To the bus 403, there are connected a graphic synthesizer (GS) 404 and an input/output processor (IOP) 409. The graphic synthesizer 404 has a RAM 405 including a frame buffer, a Z buffer, and a texture memory, and a rendering engine (RE) 406 having a rendering function to render and store images in the frame buffer in the RAM 405.

The display monitor 20 as an external device is connected to the graphic synthesizer 404 via an encoder 407 which converts a digital RGB signal, for example, into an NTSC television signal.

To the input/output processor 409, there are connected a driver (DRV) 410 for reproducing and decoding data recorded in the optical disk OD, a sound processor (SP) 412, a memory card 514 as an external memory comprising a flash memory, the manual controller 200A connected in a wireless fashion by the relay device 515, and a ROM 416 which stores an operating system, etc. The sound processor 412 is connected via an amplifier 413 to a speaker 414 and the display monitor 20 which serve as external devices, and supplies an audio signal to the speaker 414 and the display monitor 20 via the amplifier 413.

The memory card 514 comprises a card-shaped external storage device comprising a CPU or a gate array and a flash memory. The memory card 514 is detachably connected to one of the jacks 18A, 18B of the entertainment apparatus 12A shown in FIG. 13. The memory card 514 stores interim game data and a program for playing back DVDs, i.e., a DVD player program. The program for playing back DVDs can be updated by the program stored in the optical disk OD.

The manual controller 200A supplies commands (binary or multivalued commands) to the entertainment apparatus 12A when the user presses a plurality of control buttons on the manual controller 200A. The driver 410 has a decoder for decoding images that are encoded based on MPEG (Moving Picture Experts Group) standards.

Figure 17:
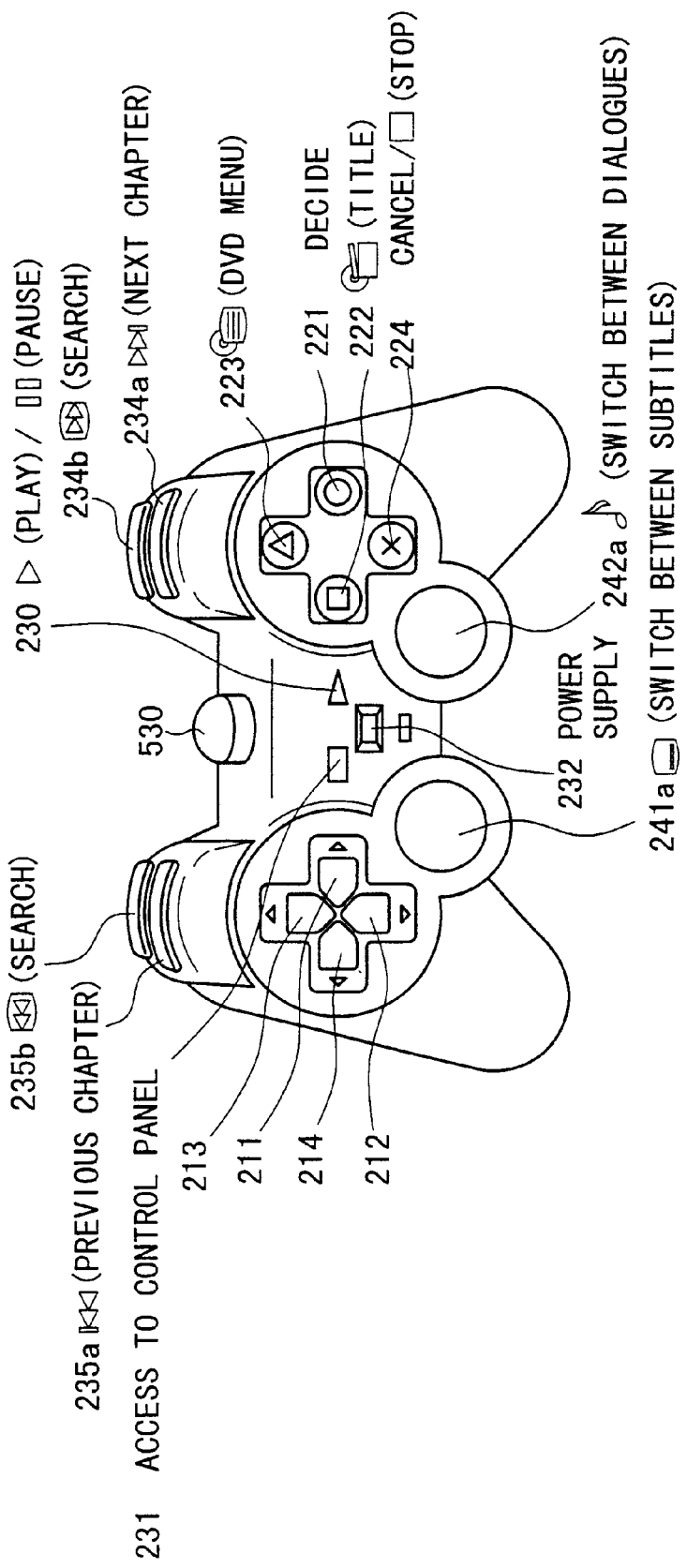
FIG. 17 is a plan view of the manual controller according to the other embodiment which is used as a wireless remote controller for an entertainment apparatus functioning as a DVD player.

FIG. 17 shows the manner in which the manual controller 200A is used as a wireless remote controller for the entertainment apparatus 12A that functions as a DVD player.

In FIG. 17, the start switch 230 functions as a playback or pause button. The selection switch 231 functions as a switch for accessing a control panel. Each time the selection switch 231 is pressed, it switches between the display and the non-display of the control panel of the DVD player on the display screen of the display monitor 20. When the control panel is being displayed, a desired function can be selected by the direction keys 211 through 214, and determined by the ○ button 221.

The Δ button 223 is used to access a DVD menu stored in the DVD as the optical disk OD, and the □ button 222 is used to access titles stored in the DVD.

The R1 button 234a is used to jump to a next chapter. The L1 button 235a is used to jump to a previous chapter. The R2 button 234b is used to perform a fast search. The L2 button 235b is used to perform a rewinding search.

The x button 224 is used to cancel an action or stop the operation of the DVD player. The R3 button 242a is a sound switching button for switching between English and Japanese dialogues. The L3 button 241a is a subtitle switching button for switching between English subtitles, Japanese subtitles, and no subtitles. The mode selection switch 232 is used to turn on and off the DVD player.

When the control panel is being displayed, the user can select a desired function using the direction keys 211 through 214, the ○ button 221, and the x button 224 by viewing the image displayed on the display monitor 20.

Figure 18:
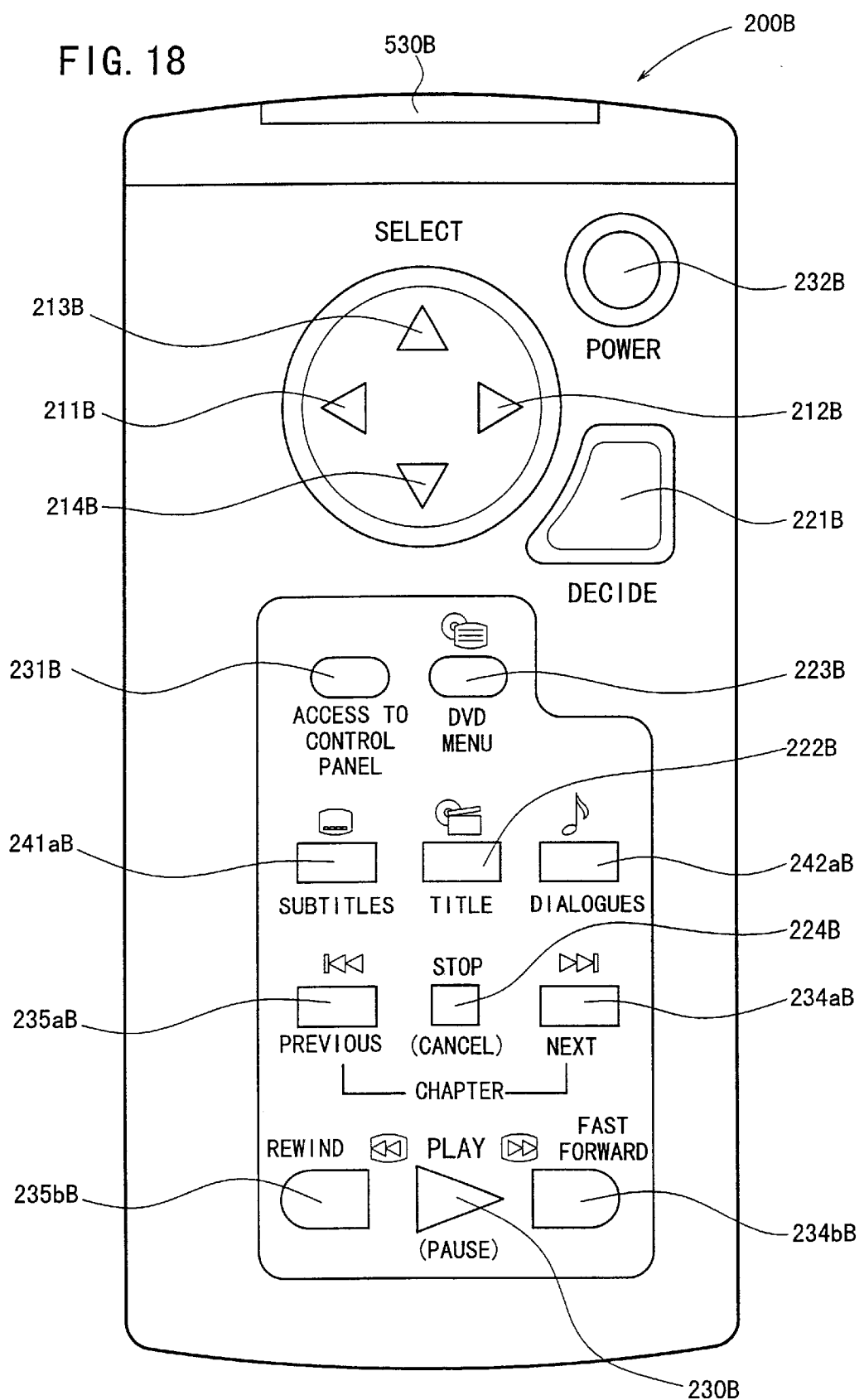
FIG. 18 is a plan view of a dedicated wireless remote controller for exclusive use with an entertainment apparatus functioning as a DVD player.

Instead of the manual controller 200A, a card-shaped manual controller 200B as shown in FIG. 18 may be used as a dedicated wireless remote controller.

Various control buttons of the manual controller 200B whose functions are identical to those of the control buttons of the manual controller shown in FIG. 17 are denoted by identical reference characters with a suffix B. and will not be described in detail below.

As described above, when the entertainment system 10A starts executing and/or is executing a program recorded in the optical disk OD or starts reproducing or is reproducing data recorded in the optical disk OD, the entertainment apparatus 12A sends transmission definition indication data Db defining a type of control data to be outputted from the manual controller 200A, via the relay device 515 to the manual controller 200A in a wireless fashion. Therefore, the amount of control data transmitted from the manual controller 200A to the entertainment apparatus 12A can be reduced when the program starts being executed or is being executed.

Since the button information register 400 as the storage unit for storing the transmission definition indication data Db is provided in either the manual controller 200A or the relay device 515 or both, it is not necessary to send the transmission definition indication data Db from the entertainment apparatus 12A to the relay device 515 or via the relay device 515 to the manual controller 200A unless the transmission definition indication data Db is changed.

If the entertainment apparatus 12A is to update or change the transmission definition indication data Db that defines a type of control data to be outputted from the manual controller 200A, then the entertainment apparatus 12A sends updating transmission definition indication data Db to the relay device 515 or via the relay device 515 to the manual controller 200A, thus updating or changing the existing transmission definition indication data Db.

According to the present invention, as described above, a type of control data to be outputted from the manual controller can be defined.

Even through the number of control units is increased, and the control units have more functions including a function to produce on-off outputs and a function to produce analog outputs depending on the pressure on the control units, the manual controller is not required to spend an increased time for communications between itself and the entertainment apparatus to which the manual controller is connected.

Stated otherwise, the time needed to perform communications between the manual controller and the entertainment apparatus to which the manual controller is connected can be reduced by adjusting or limiting types of control data to be transmitted between the manual controller and the entertainment apparatus.

Practically, the principles of the present invention are based on the fact that whereas almost all application programs do not use all, but only some of, the control buttons or function buttons of the manual controller, and differ as to which control buttons are to be used, the manual controller needs to have all the control units.

According to the present invention, it is possible to set which control buttons of the manual controller are to be used, more specifically, which control data of control buttons of the manual controller are to be transmitted to the entertainment apparatus, and such control button or control data settings can be updated by an application program that is being executed by the entertainment apparatus. In this manner, the time required to perform communications between manual controller and the entertainment apparatus can be shortened.

For example, while a game program is being executed by the entertainment apparatus, when situations (scenes) are changed, it is possible to define control units that are required in a next scene, i.e., to limit the number of enabled control units.

In addition, when the relay device for wireless communications is detachably connected to the entertainment apparatus, the manual controller can be used with the entertainment apparatus in a wireless environment.

Although certain preferred embodiments of the present invention have been shown and described in detail, it should be understood that various changes and modifications may be made therein without departing from the scope of the appended claims.

What is claimed is:

1. A program executing system, comprising:

a program executing apparatus for reading and executing a program stored in a recording medium; and a manual controller connected to said program executing apparatus and having a plurality of control units for sending control data to said program executing apparatus in response to operation by a user of at least one of said control units;

wherein said program executing apparatus detects, during execution of said program, a command issued by said program to change transmission definition indication data, said transmission definition indication data limiting data transmission from said manual controller by defining which control units from among said plurality of control units are operable during a portion of said program following issuance of said command;

and wherein said program executing apparatus sends said transmission definition indication data to said manual controller for assigning control data to be sent from said manual controller to said program executing apparatus while said program executing apparatus is executing said program.

2. A program executing system according to claim 1, wherein said manual controller has a storage unit for storing said transmission definition indication data.

3. A program executing system according to claim 1, wherein said program executing apparatus sends updated transmission definition indication data to update content of said transmission definition indication data while said program executing apparatus is executing said program.

4. A program executing system according to claim 1, wherein said program executing apparatus comprises an entertainment apparatus for reading and executing a program stored in a recording medium detachably loaded in the entertainment apparatus.

5. A program executing system, comprising:

a program executing apparatus for reading and executing a program stored in a recording medium;

a relay device connected to said program executing apparatus and having a first wireless communication unit; and a manual controller having a plurality of control units and a second wireless communication unit for communicating with said first wireless communication unit for sending control data to said program executing apparatus via said relay device in response to operation by a user of at least one of said control units;

wherein said program executing apparatus detects, during execution of said program, a command issued by said program to change transmission definition indication data, said transmission definition indication data limiting data transmission from said manual controller by defining which control units from among said plurality of control units are operable during a portion of said program following issuance of said command;

and wherein said program executing apparatus sends said transmission definition indication data to said manual controller via said relay device for assigning control data to be sent from said manual controller to said program executing apparatus while said program executing apparatus is executing said program.

6. A program executing system according to claim 5, wherein said manual controller has a storage unit for storing said transmission definition indication data.

7. A program executing system according to claim 5, wherein said program executing apparatus sends updated transmission definition indication data to update content of said transmission definition indication data while said program executing apparatus is executing said program.

8. A program executing system according to claim 5, wherein said program executing apparatus comprises an entertainment apparatus for reading and executing a program stored in a recording medium detachably loaded in the entertainment apparatus.

9. A program executing system, comprising:

a program executing apparatus for reading and executing a program stored in a recording medium;

a relay device connected to said program executing apparatus and having a first wireless communication unit; and a manual controller having a plurality of control units and a second wireless communication unit for communicating with said first wireless communication unit for sending control data to said relay device in response to operation by the user of at least one of said control units, wherein said program executing apparatus detects, during execution of said program, a command issued by said program to change transmission definition indication data, said transmission definition indication data limiting data transmission from said manual controller by defining which control units from among said plurality of control units are operable during a portion of said program following issuance of said command;

and wherein said program executing apparatus sends said transmission definition indication data to said manual controller via said relay device for assigning control data to be sent from said manual controller to said program executing apparatus while said program executing apparatus is executing said program.

10. A program executing system according to claim 9, wherein said relay device has a storage unit for storing said transmission definition indication data.

11. A program executing system according to claim 9, wherein said program executing apparatus has means for sending updating transmission definition indication data to update a content of said transmission definition indication data defining a type of control data to be sent from said manual controller via said relay device to said program executing apparatus, to said relay device when said program executing apparatus is executing said program.

12. A program executing system according to claim 9, wherein said program executing apparatus comprises an entertainment apparatus for reading and executing a program stored in a recording medium detachably loaded in the entertainment apparatus.

13. A relay device that provides communications between a program executing apparatus and a manual controller having a plurality of control units, comprising:

a connector for detachably connecting said relay device to the program executing apparatus for reading and executing a program stored in a recording medium, and for allowing data communications between said relay device and the program executing apparatus when said relay device is connected to the program executing apparatus; and a wireless communication unit for outputting and transmitting transmission definition indication data to the manual controller while the program executing apparatus is executing said program, said transmission definition indication data limiting data transmission from the manual controller by defining which control units from among the plurality of control units are operable during a portion of said program.

14. A relay device according to claim 13, wherein said program executing apparatus comprises an entertainment apparatus for reading and executing a program stored in a recording medium detachably loaded in the entertainment apparatus.

15. A relay device according to claim 13, further comprising:

a processor for processing control data transmitted from the manual controller to said relay device via said wireless communication unit according to transmission definition indication data for indicating which control units, from among said plurality of control units, are operable during a portion of said program for transmitting processed control data to said program executing apparatus, wherein said processor is operable subsequent to the transmission of said transmission definition indication data from said program executing apparatus to said relay device while said program executing apparatus is executing said program.

16. A manual controller having a plurality of control units for sending control data in response to operation by the user of at least one of said control units, comprising:

a memory for storing an instruction from an external device;

a communication unit for sending said control data to said external device; and a processor for limiting data transmission from said communication unit by controlling which control units, from among said plurality of control units, are operable according to said instruction.

17. A manual controller according to claim 16, wherein said memory stores default transmission definition indication data transmitted from said external device when said manual controller is turned on.

18. A recording medium storing a program, said program comprising the steps off:

confirming an electric connection between a program executing apparatus and a manual controller having a plurality of control units for sending control data in response to operation by the user of at least one of said control units;

issuing a command, during execution of said program, to change transmission definition indication data, said transmission definition indication data limiting data transmission from said manual controller by defining which control units, from among said plurality of control units, are operable during a portion of said program following issuance of said command; and transmitting said transmission definition indication data to said manual controller, said transmission definition indication data assigning control data to be sent from said manual controller to said program executing apparatus.

19. A program executing apparatus for connection to a manual controller having a plurality of control units, wherein said manual controller sends control data in response to operation by the user of at least one of said control units, said program executing apparatus comprising:

a processor for reading and executing a program stored in a recording medium, and detecting, during execution of said program, a command issued by said program to change transmission definition indication data, said transmission definition indication data limiting data transmission from said manual controller by defining which control units, from among said plurality of control units, are operable during a portion of said program following issuance of said command; and a data communication unit for sending said transmission definition indication data to said manual controller for assigning the control data, and for receiving control data assigned according to said transmission definition indication data from said manual controller.

* * * * *